US012254452B2

(12) United States Patent
Wright et al.

(10) Patent No.: US 12,254,452 B2
(45) Date of Patent: Mar. 18, 2025

(54) METHOD AND SYSTEM FOR EFFICIENT TRANSFER OF CRYPTOCURRENCY ASSOCIATED WITH A PAYROLL ON A BLOCKCHAIN THAT LEADS TO AN AUTOMATED PAYROLL METHOD AND SYSTEM BASED ON SMART CONTRACTS

(71) Applicant: nChain Licensing AG, Zug (CH)

(72) Inventors: Craig Steven Wright, London (GB); Stephane Savanah, London (GB)

(73) Assignee: NCHAIN LICENSING AG, Zug (CH)

( * ) Notice: Subject to any disclaimer, the term of this patent is extended or adjusted under 35 U.S.C. 154(b) by 0 days.

(21) Appl. No.: 17/405,778

(22) Filed: Aug. 18, 2021

(65) Prior Publication Data

US 2022/0114564 A1   Apr. 14, 2022

Related U.S. Application Data

(63) Continuation of application No. 16/079,083, filed as application No. PCT/IB2017/050867 on Feb. 16, 2017, now Pat. No. 11,126,976.

(30) Foreign Application Priority Data

Feb. 23, 2016 (GB) ..................................... 1603117
Feb. 23, 2016 (GB) ..................................... 1603125
(Continued)

(51) Int. Cl.
G06Q 20/06   (2012.01)
G06Q 20/38   (2012.01)
(Continued)

(52) U.S. Cl.
CPC ..... *G06Q 20/0658* (2013.01); *G06Q 20/3829* (2013.01); *H04L 9/0637* (2013.01);
(Continued)

(58) Field of Classification Search
CPC ........... G06Q 20/0658; G06Q 20/3829; G06Q 2220/00; G06Q 40/125; G06Q 10/105;
(Continued)

(56) References Cited

U.S. PATENT DOCUMENTS 5,535,276 A   7/1996 Ganesan
5,600,725 A   2/1997 Rueppel et al.
(Continued)

FOREIGN PATENT DOCUMENTS

AU   2016100059 A4   3/2016
CA   2867765 A1   4/2016
(Continued)

OTHER PUBLICATIONS

Subramanian et al. "The State of Cryptocurrencies, Their Issues and Policy Interactions", International Information Management Association, vol. 24, No. 3, 2015, pp. 25-40 (Year: 2015).*
(Continued)

*Primary Examiner* — James D Nigh
(74) *Attorney, Agent, or Firm* — Tarolli, Sundheim, Covell & Tummino LLP

(57) ABSTRACT

The invention relates to blockchain technologies such as the Bitcoin blockchain, and the tokenisation of assets or entities. It is particularly suited for implementing a payroll on a blockchain platform and comprises a method (100) and system (1) of transferring cryptocurrency from a first node (3) to a second node (7). Both nodes (3, 7) are associated with a payroll and have a respective asymmetric cryptography pair, each pair including a master private key and a master public key. Respective additional private and public keys may be determined based on the master private key, master public key and a generator value at each node. The additional private and public keys may form a hierarchical structure. A common secret may be determined at each of the
(Continued)

nodes (3, 7) based on the additional private and public keys. The common secret may be used to securely transmit confidential information across a communications network (5).

6 Claims, 12 Drawing Sheets

(30) Foreign Application Priority Data

Mar. 16, 2016 (GB) .................................... 1604495
Nov. 15, 2016 (GB) .................................... 1619301

(51) Int. Cl.
*H04L 9/06* (2006.01)
*H04L 9/08* (2006.01)
*H04L 9/14* (2006.01)
*H04L 9/30* (2006.01)
*G06Q 10/10* (2023.01)
*G06Q 40/00* (2023.01)
*H04L 9/00* (2022.01)

(52) U.S. Cl.
CPC .......... *H04L 9/0643* (2013.01); *H04L 9/0841* (2013.01); *H04L 9/14* (2013.01); *H04L 9/3066* (2013.01); *H04L 9/3073* (2013.01); *G06Q 2220/00* (2013.01); *H04L 9/50* (2022.05); *H04L 2209/56* (2013.01)

(58) Field of Classification Search
CPC ... H04L 9/0637; H04L 9/0643; H04L 9/0841; H04L 9/14; H04L 9/3066; H04L 9/3073; H04L 9/50; H04L 9/08; H04L 2209/56
USPC .......................................................... 705/71
See application file for complete search history.

(56) References Cited

U.S. PATENT DOCUMENTS

| | | |
|---|---|---|
| 5,761,305 A | 6/1998 | Vanstone et al. |
| 5,867,578 A | 2/1999 | Brickell et al. |
| 5,889,865 A | 3/1999 | Vanstone et al. |
| 5,896,455 A | 4/1999 | Vanstone et al. |
| 5,920,630 A | 7/1999 | Wertheimer et al. |
| 5,933,504 A | 8/1999 | Vanstone et al. |
| 6,061,449 A | 5/2000 | Candelore et al. |
| 6,078,667 A | 6/2000 | Johnson |
| 6,118,874 A | 9/2000 | Okamoto et al. |
| 6,122,736 A | 9/2000 | Vanstone et al. |
| 6,141,420 A | 10/2000 | Vanstone et al. |
| 6,286,098 B1 | 9/2001 | Wenig et al. |
| 6,487,660 B1 | 11/2002 | Vanstone et al. |
| 6,490,352 B1 | 12/2002 | Schroeppel |
| 6,618,483 B1 | 9/2003 | Vanstone et al. |
| 6,662,299 B1 | 12/2003 | Price, III |
| 6,704,870 B2 | 3/2004 | Vanstone et al. |
| 6,785,813 B1 | 8/2004 | Vanstone et al. |
| 6,792,530 B1 | 9/2004 | Qu et al. |
| 6,819,766 B1 | 11/2004 | Weidong |
| 6,876,745 B1 | 4/2005 | Kurumatani |
| 7,003,665 B1 | 2/2006 | Dultz et al. |
| 7,006,633 B1 | 2/2006 | Reece |
| 7,095,851 B1 | 8/2006 | Scheidt |
| 7,181,017 B1 | 2/2007 | Nagel et al. |
| 7,912,747 B2 | 3/2011 | Sachedina |
| 7,929,702 B2 | 4/2011 | Brown et al. |
| 7,970,135 B1 | 6/2011 | Schwenk |
| 8,166,481 B2 | 4/2012 | Dadiomov et al. |
| 8,401,185 B1 | 3/2013 | Telang |
| 8,520,855 B1 | 8/2013 | Kohno et al. |
| 8,522,011 B2 | 8/2013 | Spalka et al. |
| 8,855,318 B1 | 10/2014 | Patnala et al. |
| 9,209,980 B2 | 12/2015 | Bowman et al. |
| 9,251,531 B2 | 2/2016 | Sarkissian |
| 9,258,130 B2 | 2/2016 | Hwang et al. |
| 9,298,806 B1 | 3/2016 | Vessenes et al. |
| 9,350,549 B2 | 5/2016 | Lumb |
| 9,436,923 B1 | 9/2016 | Sriram et al. |
| 9,641,338 B2 | 5/2017 | Sriram et al. |
| 9,673,975 B1 | 6/2017 | Machani |
| 9,961,030 B2 | 5/2018 | Murphy et al. |
| 10,050,779 B2 | 8/2018 | Alness et al. |
| 10,068,228 B1 | 9/2018 | Winklevoss et al. |
| 10,354,325 B1 | 7/2019 | Skala et al. |
| 10,510,053 B2 | 12/2019 | Armstrong |
| 10,516,527 B1 | 12/2019 | Machani et al. |
| 10,659,223 B2 | 5/2020 | Wright et al. |
| 10,719,816 B1 * | 7/2020 | Kurani .............. G06Q 20/3672 |
| 11,115,196 B1 | 9/2021 | Triandopoulos et al. |
| 11,188,907 B1 * | 11/2021 | Vijayvergia ......... G06Q 20/023 |
| 11,210,663 B2 | 12/2021 | Voorhees |
| 11,372,455 B2 | 6/2022 | Gauthier, Jr. |
| 11,455,378 B2 | 9/2022 | Wright et al. |
| 11,663,609 B2 | 5/2023 | Christidis et al. |
| 11,727,501 B2 | 8/2023 | Wright |
| 2001/0002486 A1 | 5/2001 | Kocher et al. |
| 2001/0050990 A1 | 12/2001 | Sudia |
| 2002/0112171 A1 | 8/2002 | Ginter et al. |
| 2002/0198791 A1 | 12/2002 | Perkowski |
| 2003/0026432 A1 | 2/2003 | Woodward |
| 2003/0046202 A1 | 3/2003 | Knapp |
| 2003/0048906 A1 | 3/2003 | Vora et al. |
| 2003/0081785 A1 | 5/2003 | Boneh et al. |
| 2003/0188153 A1 | 10/2003 | Demoff et al. |
| 2004/0030932 A1 | 2/2004 | Juels et al. |
| 2004/0049687 A1 | 3/2004 | Orsini et al. |
| 2004/0078775 A1 | 4/2004 | Chow et al. |
| 2004/0111484 A1 | 6/2004 | Young et al. |
| 2004/0190181 A1 | 9/2004 | Hikosaka et al. |
| 2004/0193890 A1 | 9/2004 | Girault |
| 2004/0252831 A1 | 12/2004 | Uehara |
| 2005/0071283 A1 | 3/2005 | Randle et al. |
| 2005/0094806 A1 | 5/2005 | Jao et al. |
| 2005/0138374 A1 | 6/2005 | Zheng et al. |
| 2006/0023887 A1 | 2/2006 | Agrawal et al. |
| 2006/0034494 A1 | 2/2006 | Holloran |
| 2006/0153365 A1 | 7/2006 | Beeson |
| 2006/0153366 A1 | 7/2006 | Beeson |
| 2006/0153367 A1 | 7/2006 | Beeson |
| 2006/0153368 A1 | 7/2006 | Beeson |
| 2006/0153370 A1 | 7/2006 | Beeson |
| 2006/0156012 A1 | 7/2006 | Beeson |
| 2006/0156013 A1 | 7/2006 | Beeson |
| 2006/0161485 A1 | 7/2006 | Meldahl |
| 2006/0173788 A1 | 8/2006 | Nath Pandya et al. |
| 2006/0179319 A1 | 8/2006 | Krawczyk |
| 2006/0242038 A1 | 10/2006 | Giudilli |
| 2006/0248114 A1 | 11/2006 | Anderson et al. |
| 2007/0055880 A1 | 3/2007 | Lauter et al. |
| 2007/0165843 A1 | 7/2007 | Lauter et al. |
| 2007/0192842 A1 | 8/2007 | Beaulieu et al. |
| 2007/0223706 A1 | 9/2007 | Gantman et al. |
| 2007/0265978 A1 | 11/2007 | Kahn et al. |
| 2007/0269040 A1 | 11/2007 | Yuval et al. |
| 2007/0276836 A1 | 11/2007 | Chatterjee et al. |
| 2007/0288320 A1 | 12/2007 | Cooper et al. |
| 2008/0048022 A1 | 2/2008 | Vawter |
| 2008/0082817 A1 | 4/2008 | Takahashi et al. |
| 2008/0101596 A1 | 5/2008 | Cerruti et al. |
| 2008/0137857 A1 | 6/2008 | Bellare et al. |
| 2008/0144836 A1 | 6/2008 | Sanders et al. |
| 2008/0165955 A1 | 7/2008 | Ibrahim |
| 2008/0195499 A1 | 8/2008 | Meredith et al. |
| 2008/0260143 A1 | 10/2008 | Ibrahim |
| 2008/0263357 A1 | 10/2008 | Boyen |
| 2008/0285759 A1 | 11/2008 | Shaw |
| 2008/0288773 A1 | 11/2008 | Nguyen et al. |
| 2009/0022311 A1 | 1/2009 | Vanstone et al. |
| 2009/0048979 A1 | 2/2009 | Al-Herz et al. |
| 2009/0074179 A1 | 3/2009 | Futa et al. |
| 2009/0161876 A1 | 6/2009 | Sherkin |

(56) References Cited

U.S. PATENT DOCUMENTS

| | | |
|---|---|---|
| 2009/0282243 A1 | 11/2009 | Rose et al. |
| 2010/0005302 A1 | 1/2010 | Vishnu et al. |
| 2010/0023771 A1 | 1/2010 | Struik |
| 2010/0031369 A1 | 2/2010 | Grummt |
| 2010/0037055 A1 | 2/2010 | Fazio et al. |
| 2010/0042839 A1 | 2/2010 | Ho |
| 2010/0054458 A1 | 3/2010 | Schneider |
| 2010/0054480 A1 | 3/2010 | Schneider |
| 2010/0131752 A1 | 5/2010 | Flegel |
| 2010/0131755 A1 | 5/2010 | Zhu et al. |
| 2010/0134848 A1 | 6/2010 | Lynggaard et al. |
| 2010/0146292 A1 | 6/2010 | Shi et al. |
| 2010/0150341 A1 | 6/2010 | Dodgson et al. |
| 2010/0172501 A1 | 7/2010 | Tian et al. |
| 2010/0199095 A1 | 8/2010 | Ho |
| 2010/0217986 A1 | 8/2010 | Schneider |
| 2010/0228973 A1 | 9/2010 | Dancer et al. |
| 2010/0241848 A1 | 9/2010 | Smith et al. |
| 2010/0268778 A1 | 10/2010 | Kim et al. |
| 2010/0312810 A1 | 12/2010 | Horton et al. |
| 2011/0016510 A1 | 1/2011 | Matsuda et al. |
| 2011/0022854 A1 | 1/2011 | Macchetti et al. |
| 2011/0058672 A1 | 3/2011 | Sannino et al. |
| 2011/0202773 A1 | 8/2011 | Ghouti et al. |
| 2011/0208790 A1 | 8/2011 | Brown et al. |
| 2011/0208970 A1 | 8/2011 | Brown et al. |
| 2011/0246766 A1 | 10/2011 | Orsini et al. |
| 2011/0307698 A1 | 12/2011 | Vanstone |
| 2011/0311051 A1 | 12/2011 | Resch et al. |
| 2012/0011362 A1 | 1/2012 | Lambert |
| 2012/0039474 A1 | 2/2012 | Ho |
| 2012/0090026 A1 | 4/2012 | Andrews et al. |
| 2012/0100833 A1 | 4/2012 | Gao |
| 2012/0198228 A1 | 8/2012 | Oberheide et al. |
| 2012/0214441 A1 | 8/2012 | Raleigh |
| 2012/0233674 A1 | 9/2012 | Gladstone et al. |
| 2012/0243687 A1 | 9/2012 | Li et al. |
| 2012/0284794 A1 | 11/2012 | Trent et al. |
| 2012/0290830 A1 | 11/2012 | Resch et al. |
| 2012/0331287 A1 | 12/2012 | Bowman et al. |
| 2013/0030941 A1 | 1/2013 | Meredith et al. |
| 2013/0034642 A1 | 2/2013 | Eckstrom |
| 2013/0051552 A1 | 2/2013 | Handschuh et al. |
| 2013/0061049 A1 | 3/2013 | Irvine |
| 2013/0077783 A1 | 3/2013 | Anshel et al. |
| 2013/0103945 A1 | 4/2013 | Cannon et al. |
| 2013/0159413 A1 | 6/2013 | Davis et al. |
| 2013/0177157 A1 | 7/2013 | Li et al. |
| 2013/0191632 A1 | 7/2013 | Spector et al. |
| 2013/0198104 A1 | 8/2013 | Parker |
| 2013/0287210 A1 | 10/2013 | Matsuda et al. |
| 2013/0304642 A1 | 11/2013 | Campos |
| 2013/0305057 A1 | 11/2013 | Greco et al. |
| 2013/0305333 A1 | 11/2013 | Katzer et al. |
| 2013/0318578 A1 | 11/2013 | Palagummi |
| 2013/0318588 A1 | 11/2013 | Metzger |
| 2014/0012751 A1 | 1/2014 | Kuhn et al. |
| 2014/0046792 A1 | 2/2014 | Ganesan |
| 2014/0068246 A1 | 3/2014 | Hartley et al. |
| 2014/0082358 A1 | 3/2014 | Nakhjiri et al. |
| 2014/0108473 A1 | 4/2014 | Nowoczynski et al. |
| 2014/0129441 A1 | 5/2014 | Blanco et al. |
| 2014/0129844 A1 | 5/2014 | Johnson et al. |
| 2014/0132620 A1 | 5/2014 | Kim |
| 2014/0188719 A1 | 7/2014 | Poornachandran et al. |
| 2014/0195425 A1 | 7/2014 | Campos et al. |
| 2014/0223580 A1 | 8/2014 | Neivanov et al. |
| 2014/0250006 A1 | 9/2014 | Makhotin et al. |
| 2014/0270401 A1 | 9/2014 | Irwin et al. |
| 2014/0330923 A1 | 11/2014 | Baptist et al. |
| 2015/0006386 A1 | 1/2015 | Tebbe |
| 2015/0024764 A1 | 1/2015 | Dochow et al. |
| 2015/0039470 A1 | 2/2015 | Crites |
| 2015/0052369 A1 | 2/2015 | Koning et al. |
| 2015/0066748 A1 | 3/2015 | Winslow et al. |
| 2015/0086020 A1 | 3/2015 | Harjula et al. |
| 2015/0089616 A1 | 3/2015 | Brezinski et al. |
| 2015/0095648 A1 | 4/2015 | Nix |
| 2015/0120567 A1 | 4/2015 | Van Rooyen et al. |
| 2015/0120569 A1 | 4/2015 | Belshe et al. |
| 2015/0124961 A1 | 5/2015 | Lambert et al. |
| 2015/0154562 A1 | 6/2015 | Emmerson |
| 2015/0170112 A1 | 6/2015 | DeCastro |
| 2015/0188698 A1 | 7/2015 | Tsai |
| 2015/0188700 A1 | 7/2015 | Ben Saied et al. |
| 2015/0205929 A1 | 7/2015 | Brama |
| 2015/0206106 A1 | 7/2015 | Yago |
| 2015/0213433 A1 | 7/2015 | Khan |
| 2015/0215336 A1 | 7/2015 | Navaraj et al. |
| 2015/0244690 A1 | 8/2015 | Mossbarger |
| 2015/0254463 A1 | 9/2015 | Ryhorchuk et al. |
| 2015/0254639 A1 | 9/2015 | Radu |
| 2015/0256347 A1 | 9/2015 | Tseng et al. |
| 2015/0262139 A1 | 9/2015 | Shtylman |
| 2015/0262140 A1 | 9/2015 | Armstrong |
| 2015/0269570 A1 | 9/2015 | Phan et al. |
| 2015/0278780 A1 | 10/2015 | Vaidyanathan et al. |
| 2015/0294425 A1 | 10/2015 | Benson |
| 2015/0296570 A1 | 10/2015 | Altamura et al. |
| 2015/0302401 A1 | 10/2015 | Metral |
| 2015/0304302 A1 | 10/2015 | Zhang |
| 2015/0310497 A1 | 10/2015 | Valin et al. |
| 2015/0324764 A1 | 11/2015 | Van Rooyen et al. |
| 2015/0324789 A1 | 11/2015 | Dvorak et al. |
| 2015/0332224 A1 | 11/2015 | Melika et al. |
| 2015/0332395 A1 | 11/2015 | Walker et al. |
| 2015/0348017 A1 | 12/2015 | Allmen |
| 2015/0349958 A1 | 12/2015 | Lindell |
| 2015/0350171 A1 | 12/2015 | Brumley |
| 2015/0356523 A1 | 12/2015 | Madden |
| 2015/0363768 A1 | 12/2015 | Melika et al. |
| 2015/0363770 A1 | 12/2015 | Ronca et al. |
| 2015/0363773 A1 | 12/2015 | Ronca et al. |
| 2015/0363777 A1 | 12/2015 | Ronca et al. |
| 2015/0371224 A1 | 12/2015 | Lingappa |
| 2015/0379510 A1 | 12/2015 | Smith |
| 2015/0381729 A1 | 12/2015 | Manohar et al. |
| 2016/0012465 A1 | 1/2016 | Sharp |
| 2016/0026918 A1 | 1/2016 | Barbieri et al. |
| 2016/0027229 A1 | 1/2016 | Spanos et al. |
| 2016/0028552 A1 | 1/2016 | Spanos et al. |
| 2016/0055511 A1 | 2/2016 | Chidella et al. |
| 2016/0055583 A1 | 2/2016 | Liberty et al. |
| 2016/0065370 A1 | 3/2016 | Le Saint et al. |
| 2016/0071108 A1 | 3/2016 | Caldera et al. |
| 2016/0085955 A1 | 3/2016 | Lerner |
| 2016/0086175 A1 | 3/2016 | Finlow-Bates et al. |
| 2016/0092870 A1 | 3/2016 | Salama et al. |
| 2016/0092988 A1 | 3/2016 | Letourneau |
| 2016/0098723 A1 | 4/2016 | Feeney |
| 2016/0132684 A1 | 5/2016 | Barbas et al. |
| 2016/0140335 A1 | 5/2016 | Proulx et al. |
| 2016/0149878 A1 | 5/2016 | Pogorelik et al. |
| 2016/0162897 A1 | 6/2016 | Feeney |
| 2016/0203522 A1 | 7/2016 | Shiffert et al. |
| 2016/0203572 A1 | 7/2016 | McConaghy et al. |
| 2016/0210617 A1 | 7/2016 | Leger |
| 2016/0234026 A1 | 8/2016 | Wilkins et al. |
| 2016/0260171 A1 | 9/2016 | Ford et al. |
| 2016/0261408 A1 | 9/2016 | Peddada et al. |
| 2016/0261565 A1 | 9/2016 | Lorenz et al. |
| 2016/0261690 A1 | 9/2016 | Ford |
| 2016/0269182 A1 | 9/2016 | Sriram et al. |
| 2016/0275294 A1 | 9/2016 | Irvine |
| 2016/0275492 A1 | 9/2016 | Brickell et al. |
| 2016/0283941 A1 | 9/2016 | Andrade |
| 2016/0292672 A1 | 10/2016 | Fay et al. |
| 2016/0294562 A1 | 10/2016 | Oberheide et al. |
| 2016/0321434 A1 | 11/2016 | McCoy et al. |
| 2016/0335533 A1 | 11/2016 | Davis et al. |
| 2016/0335924 A1 | 11/2016 | Ikarashi et al. |
| 2016/0337119 A1 | 11/2016 | Hosaka et al. |
| 2016/0337124 A1 | 11/2016 | Rozman |
| 2016/0342977 A1 | 11/2016 | Lam |

(56) References Cited

U.S. PATENT DOCUMENTS

| | | |
|---|---|---|
| 2016/0342984 A1 | 11/2016 | Thomas et al. |
| 2016/0342994 A1 | 11/2016 | Davis |
| 2016/0344543 A1 | 11/2016 | Alness et al. |
| 2016/0350749 A1 | 12/2016 | Wilkins et al. |
| 2016/0352518 A1 | 12/2016 | Ford et al. |
| 2016/0379208 A1 | 12/2016 | Deliwala et al. |
| 2016/0381010 A1 | 12/2016 | Bhandari et al. |
| 2017/0005804 A1 | 1/2017 | Zinder |
| 2017/0011394 A1 | 1/2017 | Kumar et al. |
| 2017/0012948 A1 | 1/2017 | Peeters et al. |
| 2017/0017936 A1 | 1/2017 | Bisikalo et al. |
| 2017/0024817 A1 | 1/2017 | Wager et al. |
| 2017/0046664 A1 | 2/2017 | Haldenby et al. |
| 2017/0046668 A1 | 2/2017 | Rowley et al. |
| 2017/0046693 A1 | 2/2017 | Haldenby et al. |
| 2017/0046698 A1 | 2/2017 | Haldenby et al. |
| 2017/0046792 A1 | 2/2017 | Haldenby et al. |
| 2017/0046806 A1 | 2/2017 | Haldenby et al. |
| 2017/0061138 A1 | 3/2017 | Lambert |
| 2017/0061833 A1 | 3/2017 | Joye et al. |
| 2017/0075877 A1 | 3/2017 | Lepeltier |
| 2017/0083907 A1 | 3/2017 | McDonough et al. |
| 2017/0083910 A1 | 3/2017 | Kraemer et al. |
| 2017/0091148 A1 | 3/2017 | Takahashi |
| 2017/0091750 A1 | 3/2017 | Maim |
| 2017/0091764 A1 | 3/2017 | Lloyd et al. |
| 2017/0103385 A1 | 4/2017 | Wilson, Jr. et al. |
| 2017/0109540 A1 | 4/2017 | Heiman et al. |
| 2017/0116608 A1* | 4/2017 | Forzley .............. G06Q 20/4014 |
| 2017/0124348 A1 | 5/2017 | Pourzandi et al. |
| 2017/0132620 A1 | 5/2017 | Miller et al. |
| 2017/0132621 A1 | 5/2017 | Miller et al. |
| 2017/0148016 A1 | 5/2017 | Davis |
| 2017/0154331 A1 | 6/2017 | Voorhees |
| 2017/0154391 A1 | 6/2017 | Watkins et al. |
| 2017/0169403 A1 | 6/2017 | Zhang |
| 2017/0178237 A1 | 6/2017 | Wong |
| 2017/0178263 A1 | 6/2017 | Kraemer et al. |
| 2017/0185527 A1 | 6/2017 | Ueda |
| 2017/0187535 A1 | 6/2017 | Middleton et al. |
| 2017/0200137 A1 | 7/2017 | Vilmont |
| 2017/0228547 A1 | 8/2017 | Smith et al. |
| 2017/0243193 A1 | 8/2017 | Manian et al. |
| 2017/0243214 A1 | 8/2017 | Johnsrud et al. |
| 2017/0250801 A1 | 8/2017 | Chen et al. |
| 2017/0300877 A1 | 10/2017 | Mann et al. |
| 2017/0308580 A1 | 10/2017 | Naganuma et al. |
| 2017/0316390 A1 | 11/2017 | Smith et al. |
| 2017/0324663 A1 | 11/2017 | Menase |
| 2017/0324715 A1 | 11/2017 | Frincu et al. |
| 2018/0025670 A1 | 1/2018 | Ikarashi et al. |
| 2018/0034810 A1 | 2/2018 | Pe'Er et al. |
| 2018/0096360 A1 | 4/2018 | Christidis et al. |
| 2018/0109377 A1 | 4/2018 | Fu |
| 2018/0123780 A1 | 5/2018 | Ikarashi |
| 2018/0131512 A1 | 5/2018 | Gajek |
| 2018/0146367 A1 | 5/2018 | Altin et al. |
| 2018/0176017 A1 | 6/2018 | Rodriguez et al. |
| 2018/0176222 A1 | 6/2018 | Bhaskar et al. |
| 2018/0225431 A1 | 8/2018 | Ikarashi et al. |
| 2018/0240107 A1 | 8/2018 | Andrade |
| 2018/0247191 A1 | 8/2018 | Katz et al. |
| 2018/0276663 A1 | 9/2018 | Arora |
| 2018/0285840 A1 | 10/2018 | Hasan |
| 2018/0341648 A1 | 11/2018 | Kakavand et al. |
| 2018/0349572 A1 | 12/2018 | Chen et al. |
| 2018/0367298 A1 | 12/2018 | Wright et al. |
| 2018/0376318 A1 | 12/2018 | Wang et al. |
| 2019/0014094 A1 | 1/2019 | Le Saint |
| 2019/0034936 A1 | 1/2019 | Nolan et al. |
| 2019/0080321 A1 | 3/2019 | Mundis et al. |
| 2019/0080404 A1 | 3/2019 | Molinari et al. |
| 2019/0080406 A1 | 3/2019 | Molinari et al. |
| 2019/0130368 A1 | 5/2019 | Li et al. |
| 2019/0149337 A1 | 5/2019 | Savanah et al. |
| 2019/0158470 A1 | 5/2019 | Wright et al. |
| 2019/0188793 A1 | 6/2019 | Molinari et al. |
| 2019/0199531 A1 | 6/2019 | Staples et al. |
| 2019/0220859 A1 | 7/2019 | Weight et al. |
| 2019/0229911 A1 | 7/2019 | Allen |
| 2019/0238334 A1 | 8/2019 | Nakamura |
| 2019/0244186 A1 | 8/2019 | Guo et al. |
| 2019/0266132 A1 | 8/2019 | Rubenstein |
| 2019/0305863 A1 | 10/2019 | Fayyad |
| 2019/0340352 A1 | 11/2019 | Peeters et al. |
| 2019/0349733 A1 | 11/2019 | Nolan et al. |
| 2019/0378139 A1 | 12/2019 | Stribady et al. |
| 2019/0392118 A1 | 12/2019 | Elden et al. |
| 2019/0392536 A1 | 12/2019 | Rice |
| 2020/0026785 A1 | 1/2020 | Patangia et al. |
| 2020/0250176 A1 | 8/2020 | Padmanabhan |
| 2020/0264676 A1 | 8/2020 | Gauthier, Jr. |
| 2020/0285935 A1 | 9/2020 | Song et al. |
| 2021/0056070 A1 | 2/2021 | Kakavand et al. |
| 2021/0194677 A1 | 6/2021 | Pourzandi et al. |
| 2021/0304198 A1 | 9/2021 | Lingappa |
| 2021/0409489 A1 | 12/2021 | Speasl et al. |

FOREIGN PATENT DOCUMENTS

| | | |
|---|---|---|
| CN | 1262007 A | 8/2000 |
| CN | 101447980 A | 6/2009 |
| CN | 101477669 A | 7/2009 |
| CN | 102144371 A | 8/2011 |
| CN | 102938036 A | 2/2013 |
| CN | 103440209 A | 12/2013 |
| CN | 103795529 A | 5/2014 |
| CN | 103927656 A | 7/2014 |
| CN | 104320262 A | 1/2015 |
| CN | 104331516 A | 2/2015 |
| CN | 104392354 A | 3/2015 |
| CN | 104463001 A | 3/2015 |
| CN | 104620535 A | 5/2015 |
| CN | 104704504 A | 6/2015 |
| CN | 105204802 A | 12/2015 |
| CN | 105306194 A | 2/2016 |
| CN | 105323064 A | 2/2016 |
| CN | 106022917 A | 10/2016 |
| CN | 106411503 A | 2/2017 |
| DE | 102010002241 B4 | 3/2012 |
| EP | 1477882 A2 | 11/2004 |
| EP | 2237473 A1 | 10/2010 |
| EP | 2538606 A1 | 12/2012 |
| EP | 2975570 A1 | 1/2016 |
| EP | 3010176 A1 | 4/2016 |
| FR | 3018370 A1 | 9/2015 |
| FR | 3018377 A1 | 9/2015 |
| FR | 3018378 A1 | 9/2015 |
| FR | 3018379 A1 | 9/2015 |
| JP | H11239124 A | 8/1999 |
| JP | H11289324 A | 10/1999 |
| JP | 2000502553 A | 2/2000 |
| JP | 2001069566 A | 3/2001 |
| JP | 2001195479 A | 7/2001 |
| JP | 2002026895 A | 1/2002 |
| JP | 2004192587 A | 7/2004 |
| JP | 2004246882 A | 9/2004 |
| JP | 2004341152 A | 12/2004 |
| JP | 2006293764 A | 10/2006 |
| JP | 2007036910 A | 2/2007 |
| JP | 2007067631 A | 3/2007 |
| JP | 2007242221 A | 9/2007 |
| JP | 2008136063 A | 6/2008 |
| JP | 2008146601 A | 6/2008 |
| JP | 2009105824 A | 5/2009 |
| JP | 2009171292 A | 7/2009 |
| JP | 2009526411 A | 7/2009 |
| JP | 2010503320 A | 1/2010 |
| JP | 2010219912 A | 9/2010 |
| JP | 2011082662 A | 4/2011 |
| JP | 2011211461 A | 10/2011 |
| JP | 2012515393 A | 7/2012 |
| JP | 2014068140 A | 4/2014 |
| JP | 2014153583 A | 8/2014 |

(56) References Cited

FOREIGN PATENT DOCUMENTS

| | | | |
|---|---|---|---|
| JP | 2015536617 A | 12/2015 | |
| JP | 5858506 B1 | 2/2016 | |
| JP | 5858507 B1 | 2/2016 | |
| JP | 2019512909 A | 5/2019 | |
| KR | 20110012085 A | 2/2011 | |
| KR | 101544722 B1 | 8/2015 | |
| KR | 101579232 B1 | 1/2016 | |
| KR | 20160009716 A | 1/2016 | |
| RU | 2015108134 A | 10/2016 | |
| RU | 2015109271 A | 10/2016 | |
| TW | 201202975 A | 1/2012 | |
| WO | 2005096542 A1 | 10/2005 | |
| WO | 2005107141 A1 | 11/2005 | |
| WO | 2007113040 A1 | 10/2007 | |
| WO | 2012039474 A1 | 3/2012 | |
| WO | 2012054785 A1 | 4/2012 | |
| WO | 2013034278 A2 | 3/2013 | |
| WO | 2013053058 A1 | 4/2013 | |
| WO | 2015127789 A1 | 9/2015 | |
| WO | 2015142765 A1 | 9/2015 | |
| WO | 2015171580 A1 | 11/2015 | |
| WO | 2015175854 A2 | 11/2015 | |
| WO | 2015188151 A1 | 12/2015 | |
| WO | 2015194798 A1 | 12/2015 | |
| WO | 2016022864 A2 | 2/2016 | |
| WO | 2016137360 A2 | 9/2016 | |
| WO | 2016137499 A1 | 9/2016 | |
| WO | 2016161073 A1 | 10/2016 | |
| WO | 2017006134 A1 | 1/2017 | |
| WO | 2017112664 A1 | 6/2017 | |

OTHER PUBLICATIONS

Fimkrypto, "FIMK 0.6.4 Released," Github.com, Feb. 11, 2016 [retrieved Jan. 30, 2017], https://github.com/fimkrypto/fimk/releases, 17 pages.
Flood et al., "Contract as Automaton: The Computational Representation of Financial Agreements," Office of Financial Research Working Paper No. 15-04, Mar. 26, 2015, 25 pages.
Fotiou et al., "Decentralized Name-based Security for Content Distribution using Blockchains," retrieved from, Mobile Multimedia Laboratory, Department of Informatics, Apr. 14, 2016, 6 pages.
Franco, "Understanding Bitcoin: Cryptography, Engineering and Economics," Wiley, ISBN: 978-1-119-01916-9, Oct. 2014, 144 pages.
Friedenbach et al., "Freimarkets: extending bitcoin protocol with user-specified bearer instruments, peer-to-peer exchange, off-chain accounting, auctions, derivatives and transitive transactions," Version v0.01, http://freico.in/docs/freimarkets-v0.0.1.pdf, Aug. 24, 2013 [retrieved Dec. 12, 2018], 25 pages.
Friedenbach, "[Bitcoin-development] New Output Script Type," Linux Foundation, Sep. 14, 2013, https://lists.linuxfoundation.org/pipermail/bitcoin-dev/2013-September/003256.html, 2 pages.
Fuchita, "Special Topic: Innovation and Finance, Blockchain and Financial Transaction Innovation," Nomura Capital Market Quarterly 19-2(74):11-35, Nov. 1, 2015.
Fujimura et al., "BRIGHT: A Concept for a Decentralized Rights Management System Based on Blockchain," 2015 IEEE 5th International Conference on Consumer Electronics-Berlin (ICCE-Berlin), Sep. 6, 2015, 2 pages.
Gautham, "Bitwage Makes Bitcoin Payroll Easier with New Features," NewsBTC, Mar. 9, 2016 (retrieved Jun. 16, 2020), https://www.newsbtc.com/2016/03/09/bitwage-makes-bitcoin-payroll-easier-new-features/, 4 pages.
Gennaro et al., "Threshold-Optimal DSA/ECDSA Signatures and an Application to Bitcoin Wallet Security," International Conference on Applied Cryptography and Network Security, Jun. 9, 2016, 42 pages.
Gitbook, "Ethereum Frontier Guide," Gitbook (Legacy), Feb. 4, 2016, 293 pages.
Github, "Bitcoin/Bips," retrieved from http://web.archive.org/web/20150307191218/https://github.com/bitcoin/bips/blob/master/bip-0016.mediawiki, Apr. 5, 2014, 4 pages.
github.com, "Dual Key Stealth Address", About Shadow, https://github.com/shadowproject/Shadow-Docs/blob/88501b5ba019780ef9a62d26678932c54a434e08/source/index.md, Mar. 10, 2016, 27 pages.
Goldfeder et al., "Securing Bitcoin Wallets via a New DSA/ECDSA threshold signature scheme," manuscript, https://www.cs.princeton.edu/~stevenag/threshold_sigs.pdf, 2015 [retrieved Jun. 21, 2018], 26 pages.
Goldfeder et al., "Securing Bitcoin wallets via threshold signatures" Princeton's Center for Information Technology Policy, Mar. 28, 2014, 11 pages.
Goldfeder et al., "Threshold signatures and Bitcoin wallet security: A menu of options," Freedom to Tinker, May 23, 2014 [retrieved Nov. 16, 2020], https://freedom-to-tinker.com/2014/05/23/threshold-signatures-and-bitcoin-wallet-security-a-menu-of-options/, 3 pages.
Gutoski et al., "Hierarchical deterministic Bitcoin wallets that tolerate key leakage (Short paper)," Financial Cryptography and Data Security: 19th International Conference, FC 2015, Revised Selected Papers, Jan. 26, 2015, 9 pages.
Hacker News, "Cryptocontracts Will Turn Contract Law into a Programming Language," retrieved from https://news.ycombinator.com/item?id=7287155, Feb. 23, 2014, 12 pages.
Hao, "On Robust Key Agreement Based on Public Key Authentication," International Conference on Financial Cryptography and Data Security, Jan. 25, 2010, 12 pages.
Harayama et al., "Key escrow method of personal decryptographic key by using elliptic curve calculation," Institute of Electronics, Information and Communication Engineers (IEICE) Technical Report 109(85):91-96, Jun. 11, 2009.
Hearn, "Distributed markets," Bitcoin Wiki, https://en.bitcoin.it/wiki/Distributed_markets, Jul. 11, 2015 [retrieved Sep. 20, 2016], 5 pages.
Herbert et al., "A Novel Method for Decentralised Peer-to-Peer Software License Validation Using Cryptocurrency Blockchain Technology," Proceedings of the 38th Australasian Computer Science Conference, Jan. 27, 2015, 9 pages.
International Search Report and Written Opinion dated Apr. 10, 2017, Patent Application No. PCT/IB2017/050861, 11 pages.
International Search Report and Written Opinion dated Apr. 12, 2017, Patent Application No. PCT/IB2017/050818, 10 pages.
International Search Report and Written Opinion dated Apr. 12, 2017, Patent Application No. PCT/IB2017/050829, 9 pages.
International Search Report and Written Opinion dated Apr. 12, 2017, Patent Application No. PCT/IB2017/050866, 10 pages.
International Search Report and Written Opinion dated Apr. 21, 2017, Patent Application No. PCT/IB2017/050820, 12 pages.
International Search Report and Written Opinion dated Apr. 26, 2017, International Patent Application No. PCT/IB2017/050865, filed Feb. 16, 2017, 9 pages.
International Search Report and Written Opinion dated Apr. 3, 2017, Patent Application No. PCT/IB2017/050824, filed Feb. 14, 2017, 13 pages.
International Search Report and Written Opinion dated Apr. 3, 2017, Patent Application No. PCT/IB2017/050827, 10 pages.
International Search Report and Written Opinion dated Apr. 3, 2017, Patent Application No. PCT/IB2017/050827, 13 pages.
International Search Report and Written Opinion dated Mar. 29, 2017, Patent Application No. PCT/IB2017/050821, 10 pages.
International Search Report and Written Opinion dated Mar. 30, 2017, Patent Application No. PCT/IB2017/050819, 13 pages.
International Search Report and Written Opinion dated Mar. 30, 2017, Patent Application No. PCT/IB2017/050825, 9 pages.
International Search Report and Written Opinion dated May 29, 2017, International Patent Application No. PCT/IB2017/050815, filed Feb. 14, 2017, 10 pages.
International Search Report and Written Opinion dated May 31, 2017, Patent Application No. PCT/IB2017/050856, filed Feb. 16, 2017, 11 pages.
International Search Report and Written Opinion dated May 31, 2017, Patent Application No. PCT/IB2017/050867, 11 pages.

(56) References Cited

OTHER PUBLICATIONS

International Search Report and Written Opinion dated May 31, 2017, Patent Application No. PCT/IB2017/050979, filed Feb. 21, 2017, 11 pages.
International Search Report and Written Opinion dated May 31, 2017, Patent Application No. PCT/IB2017/050980, 12 pages.
Japanese Notice of Reason(s) for Rejection dated Mar. 30, 2021, Patent Application No. 2018-539890, 8 pages.
Japanese Notice of Reason(s) for Rejection dated Mar. 30, 2021, Patent Application No. 2018-539893, 6 pages.
Japanese Office Action dated Feb. 16, 2021, Patent Application No. 2018-539331, 7 pages.
Japanese Office Action dated Jan. 22, 2019, Patent Application No. 2018-516682, filed Feb. 16, 2017, 14 pages.
Japanese Office Action dated Oct. 6, 2020, Patent Application No. 2018-539865, 14 pages.
Japanese Office Action dated Oct. 8, 2019, Patent Application No. 2018-539895, 9 pages.
Jesionek et al., "BIP0032: Hierarchical Deterministic Wallets," GitHub, https://github.com/bitcoin/bips/blob/master/bip-0032.mediawiki, Jan. 2014, 9 pages.
il2012 et al., "MinAddress : Now remember your addresses easily," BitCoinTalk, Sep. 16, 2014 (retrieved Jun. 16, 2020), https://bitcointalk.org/index.php?topic=774741.150;wap2, 3 pages.
Ken K., "Tutorial 1: Your first contract," Ethereum.org, Dec. 2014, https://web.archive.org/save/_embed/https://forum.ethereum.org/discussion/1634/tutorial-1-your-first-contract/p1, 22 pages.
Kens et al., "Cryptocontracts Will Turn Contract Law Into a Programming Language ," Hacker News, Feb. 23, 2014, https://news.ycombinator.com/item?id=7287155, 12 pages.
Killerstorm et al., "Transcript for #bitcoin-dev Sep. 3, 2012," BitcoinStats, http://www.bitcoinstats.com/irc/bitcoin-dev/logs/2012/09/03, Sep. 3, 2012 [retrieved Dec. 21, 2018], 14 pages.
White, "How Computers Work," Que Publishing 7th Edition, Oct. 15, 2003, 44 pages.
Whitequark, "#bitcoin-wizards on Jul. 30, 2015—irc logs at whitequark.org," whitequark.org, https://irclog.whitequark.org/bitcoin-wizards/2015-07-30, Jul. 30, 2015 [retrieved Dec. 12, 2018], 8 pages.
Wikipedia, "Counterparty (platform)," Wikipedia, the Free Encyclopedia, last edited Dec. 6, 2019 [retrieved Jan. 13, 2020], https://en.wikipedia.org/wiki/Counterparty_(platform), 2 pages.
Wikipedia, "Shamir's Secret Sharing," Wikipedia the Free Encyclopedia, Jan. 20, 2017 version [retrieved on Jan. 9, 2019], https://en.wikipedia.org/w/index.php?title=Shamir's_Secret_Sharing&oldid=761082071, 6 pages.
Wikipedia, "Shamir's Secret Sharing," Wikipedia the Free Encyclopedia, Mar. 6, 2016 version [retrieved on Jun. 24, 2019], https://en.wikipedia.org/w/index.php?title=Shamir's_Secret_Sharing&oldid=708636892, 6 pages.
Willet et al., "Omni Protocol Specification (formerly Mastercoin)," Github, Nov. 5, 2013 [retrieved May 12, 2020], https://github.com/OmniLayer/spec/blob/9978cc3984ae0b6e51216c4ae74042fc4097b993/README.md, 69 pages.
Willoms et al., "Using blockchain to save and verify software licensing," Bitcoin Forum, https://bitcointalk.org/index.php?topic=671435.0, Jun. 30, 2014 [retrieved Dec. 13, 2018], 9 pages.
Wood, "Ethereum: A Secure Decentralised Generalised Transaction Ledger: Final Draft—Under Review," Etereum Project Yellow Paper, http://tech.lab.carl.pro/kb/ethereum/yellowpaper, Apr. 2014, 32 pages.
Wright, "Registry and Automated Management Method for Blockchain Enforced Smart Contracts," U.S. Appl. No. 15/138,717, filed Apr. 26, 2016.
Wuille, "Hierarchical Deterministic Wallets," Github, https://github.com/bitcoin/bips/blob/ab90b5289f0356282397fa9b8aa47d2238a7b380/bip-0032.mediawiki, Feb. 12, 2016 (retrieved Mar. 23, 2017), 9 pages.
Yaokai et al., "Experimental evaluation of the next-generation cryptocurrency platform Ethereum," CSS2015 Computer Security Symposium 2015 Proceedings 2015(3):1151-1158, Oct. 14, 2015.
Zhang et al., "AntShare Trading Platform," Github.com, Jun. 3, 2016 (last edited Aug. 21, 2016) [retrieved Jan. 30, 2017], https://github.com/AntShares/AntShares/wiki/Whitepaper-1.1, 9 pages.
Zyskind et al., "Decentralizing Privacy: Using a Blockchain to Protect Personal Data," 2015 IEEE CS Security and Privacy Workshops, May 21, 2015, 5 pages.
Zyskind et al., "Enigma: Decentralized Computation Platform with Guaranteed Privacy," arXiv preprint arXiv:1506, Jun. 10, 2015, 14 pages.
Third-Party Submission Under 37 CFR 1.290 mailed Jun. 12, 2019, U.S. Appl. No. 16/078,605, filed Aug. 21, 2018, 31 pages.
Third-Party Submission Under 37 CFR 1.290 mailed Jun. 12, 2019, U.S. Appl. No. 16/079,089, filed Aug. 22, 2018, 19 pages.
Timeisnow77724 et al., "Help understanding counterparty, thanks in advance!," Reddit r/counterparty_xcp, https://www.reddit.com/r/counterparty_xcp/comments/2qntze/help_understanding_counterparty_thanks_in_advance/, Dec. 28, 2014 [retrieved Dec. 11, 2018], 4 pages.
Toomim, "P2pool as prior art for nChain's Turing Complete Transactions patent—or, how to patent all blockchain apps without anybody noticing," Medium, Sep. 3, 2018, https://medium.com/@j_73307/p2pool-as-prior-art-for-nchains-turing-complete-transactions-patent-or-how-to-patent-all-40f3d429eaa4, 13 pages.
Tuesta et al., "Smart contracts: the ultimate automation of trust?," BBVA Research Financial Inclusion Unit, Oct. 2015, 5 pages.
UK Commercial Search Report dated Apr. 25, 2016, Patent Application No. 11603117.1, filed Feb. 23, 2016, 11 pages.
UK Commercial Search Report dated Feb. 17, 2017, Patent Application No. 1604493.5, 8 pages.
UK Commercial Search Report dated Jan. 13, 2017, Patent Application No. 1604498.4, 8 pages.
UK Commercial Search Report dated Jun. 14, 2016, Patent Application No. 1607249.8, 4 pages.
UK Commercial Search Report dated Jun. 27, 2016, Patent Application No. GB1603123.9, filed Feb. 23, 2016, 11 pages.
UK Commercial Search Report dated Jun. 27, 2016, Patent Application No. GB1603125.4, 11 pages.
UK Commercial Search Report dated Jun. 27, 2016, Patent Application No. GB1603125.4, filed Feb. 23, 2016, 11 pages.
UK Commercial Search Report dated Jun. 28, 2016, Patent Application No. GB1603122.1, filed Feb. 23, 2016, 12 pages.
UK Commercial Search Report dated Jun. 6, 2016, Patent Application No. 1604497.6, filed Mar. 16, 2016, 6 pages.
UK Commercial Search Report dated Jun. 9, 2016, Patent Application No. GB1603117.1, filed Feb. 23, 2016, 12 pages.
UK Commercial Search Report dated May 16, 2016, Patent Application No. GB1603125.4, 8 pages.
UK Commercial Search Report dated May 20, 2016, Patent Application No. 1605026.2, 4 pages.
UK Commercial Search Report dated May 24, 2016, Patent Application No. GB1605571.7, filed Apr. 1, 2016, 3 pages.
UK Commercial Search Report dated May 9, 2016, Patent Application No. GB1603112.2, 6 pages.
UK Commercial Search Report dated May 9, 2016, Patent Application No. GB1603114.8, filed Feb. 23, 2016, 2 pages.
UK Commercial Search Report dated Nov. 14, 2016, Patent Application No. GB1607063.3, 8 pages.
UK Commercial Search Report dated Nov. 30, 2016, Patent Application No. 1607058.3, filed Apr. 22, 2016, 7 pages.
UK Commercial Search Report dated Oct. 10, 2016, Patent Application No. GB1607484.1, filed Apr. 29, 2016, 5 pages.
UK Commercial Search Report dated Sep. 30, 2016, Patent Application No. 1606630.0, filed Apr. 15, 2016, 7 pages.
UK Expanded Commercial Search Report dated Jun. 15, 2016, Patent Application No. 1605026.2, 5 pages.
UK IPO Search Report dated Dec. 12, 2016, Patent Application No. GB1606630.0, filed Apr. 15, 2016, 4 pages.
UK IPO Search Report dated Dec. 15, 2016, Patent Application No. GB1607063.3, 6 pages.
UK IPO Search Report dated Dec. 21, 2016, Patent Application No. GB1607058.3, 3 pages.
UK IPO Search Report dated Dec. 21, 2016, Patent Application No. GB1607058.3, filed Apr. 22, 2016, 3 pages.

(56) References Cited

OTHER PUBLICATIONS

UK IPO Search Report dated Dec. 23, 2016, Patent Application No. GB1604495.0, 5 pages.
UK IPO Search Report dated Dec. 28, 2016, Patent Application No. GB1604497.6, filed Mar. 16, 2016, 4 pages.
UK IPO Search Report dated Dec. 5, 2016, Patent Application No. 1607249.8, 4 pages.
UK IPO Search Report dated Dec. 6, 2016, Patent Application No. 1604493.5, 6 pages.
UK IPO Search Report dated Dec. 6, 2016, Patent Application No. 1607482.5, 5 pages.
UK IPO Search Report dated Jan. 25, 2017, Patent Application No. 1605026.2, 3 pages.
UK IPO Search Report dated Jan. 3, 2017, Patent Application No. 1604498.4, 4 pages.
UK IPO Search Report dated Jul. 26, 2016, Patent Application No. GB1603114.8, filed Feb. 23, 2016, 5 pages.
UK IPO Search Report dated Jul. 4, 2016, Patent Application No. GB1603125.4, 6 pages.
UK IPO Search Report dated Jul. 4, 2016, Patent Application No. GB1603125.4, filed Feb. 23, 2016, 6 pages.
UK IPO Search Report dated Jul. 5, 2016, Patent Application No. GB1603123.9, filed Feb. 23, 2016, 5 pages.
UK IPO Search Report dated Oct. 17, 2016, Patent Application No. GB1603117.1, filed Feb. 23, 2016, 5 pages.
UK IPO Search Report dated Oct. 21, 2016, Patent Application No. GB1603112.2, 4 pages.
UK IPO Search Report dated Oct. 26, 2016, Patent Application No. GB1603122.1, filed Feb. 23, 2016, 4 pages.
UK IPO Search Report dated Sep. 9, 2016, Patent Application No. GB1605571.7, filed Apr. 1, 2016, 5 pages.
Vayngrib, "DHT hardening," GitHub, https://github.com/tradle/about/wiki/DHT-hardening, Feb. 2, 2015 (last updated May 21, 2015) [retrieved Dec. 13, 2018], 5 pages.
Vayngrib, "Future, operating business on chain," Github.com, May 4, 2015 [retrieved Jan. 30, 2017], https://github.com/tradle/about/wiki/Future,-operating-business-on-chain, 9 pages.
Vietnamese Office Action dated Sep. 27, 2018, Patent Application No. 1-2018-03358, filed Feb. 16, 2017, 2 pages.
Walport et al., "Distributed Ledger Technology: beyond block chain—A report by the UK Government Chief Scientific Adviser," United Kingdom Government Office for Science, Dec. 2015, 88 pages.
Watanabe et al., "Blockchain contract: A complete consensus using blockchain," IEEE 4th Global Conference on Consumer Electronics, Oct. 27, 2015, 3 pages.
Weller et al., "CounterpartyXCP/Documentation: Protocol Specification," Github.com, Jan. 25, 2015 (last edited Jun. 17, 2019) [retrieved Jan. 13, 2020], https://github.com/CounterpartyXCP/Documentation/blob/master/Developers/protocol_specification.md, 10 pages.
Koblitz et al., "Cryptocash, Cryptocurrencies, and Cryptocontracts," Designs, Codes and Cryptography 78(1):87-102, publication available online Oct. 1, 2015, print publication Jan. 2016.
Kosba et al., "Hawk: The Blockchain Model of Cryptography and Privacy-Preserving Smart Contracts," IEEE Symposium on Security and Privacy, May 22, 2016, 31 pages.
Kravchenko, "Distributed multi-ledger model for financial industry," Github.com, Oct. 21, 2015 [retrieved Jan. 30, 2017], https://github.com/WebOfTrustInfo/rebooting-the-web-of-trust/blob/master/topics-andadvance-readings/DistributedMulti-ledgerModelForFinancialIndustry.md, 2 pages.
Krawczyk, "HMQV: A High-Performance Secure Diffie-Hellman Protocol," Annual International Cryptology Conference 2005, Aug. 14, 2005, first disclosed online Jul. 5, 2005, 66 pages.
Krellenstein, "The Counterparty Protocol," GitHub, https://github.com/jsimnz/Counterparty/blob/master/README.md, Jan. 8, 2014 [Dec. 12, 2018], 4 pages.

Lebeau, "An Ethereum Journey to Decentralize All Things," retrieved from https://medium.com/@SingularDTV/an-ethereum-journey-to-decentralize-all-things-8d62b02e232b#.r6n9w8kqh, Jul. 11, 2016, 10 pages.
Luu et al., "Demystifying Incentives in the Consensus Computer," ISBN, Oct. 2015, 14 pages.
Mainelli, "Blockchain: why smart contracts need shrewder people," Banking Technology, Apr. 4, 2016 [retrieved Jan. 30, 2017], http://www.bankingtech.com/461572/blockchain-why-smart-contracts-need-shrewderpeople/, 3 pages.
Maxwell et al., "Deterministic wallets," Bitcoin Forum, https://bitcointalk.org/index.php?topic=19137.0;all, Jun. 18, 2011 [retrieved Dec. 10, 2018], 104 pages.
McCorry et al., "Authenticated Key Exchange over Bitcoin," International Conference on Research in Security Standardisation 2015, Dec. 15, 2015, 18 pages.
Menezes et al., "Handbook of Applied Cryptography: pp. 33, 38," CRC Press, Oct. 16, 1996, 3 pages.
Mezzomix et al., "Angebot: BTC (2-aus-3) Multisig Escrow (Treuhandabwicklung)," Bitcoin Forum, Feb. 9, 2014, https://bitcointalk.org/index.php?topic=456563.0, 7 pages.
Michalko et al., "Decent Whitepaper," retrieved from http://forklog.net/decent-finalizes-its-decentralized-content-distribution-platform/, Nov. 2015, 20 pages.
Michalko, "Decent Finalizes its Decentralized Content Distribution Platform," retrieved from http://forklog.net/decent-finalizes-its-decentralized-content-distribution-platform/, Dec. 14, 2016, 2 pages.
Mike et al., "Contract," Bitcoin Wiki, Oct. 22, 2015 version (first disclosed May 22, 2011) [retrieved May 12, 2020], https://en.bitcoin.it/w/index.php?title=Contract&oldid=59172, 11 pages.
Minsky et al., "Computation: Finite and Infinite Machines Chapter 14: Very Simple Bases for Computability," Prentice Hall, Inc, 1967, 29 pages.
Mrbandrews, "Bitcoin Core 0.11 (ch 2): Data Storage," Bitcoin Wiki, Jan. 13, 2016 (last revision Jan. 21, 2016) [retrieved May 8, 2020], https://en.bitcoin.it/w/index.php?title=Bitcoin_Core_0.11_(ch_2):_Data_storage&oldid=60024, 10 pages.
Mülli, "A Decentralized Bitcoin Exchange with Bitsquare—Attack Scenarios and Countermeasures," University of Zurich Department of Informatics Communication Systems Group Master Thesis, Jul. 30, 2015, 61 pages.
Nakamoto, "Bitcoin: A Peer-to-Peer Electronic Cash System," Bitcoin, Oct. 31, 2008, https://bitcoin.org/bitcoin.pdf, 9 pages.
Noizat et al., "Blockchain Electronic Vote," retrieved from https://www.weusecoins.com/assets/pdf/library/blockchain-electronic-vote.pdf, Apr. 29, 2015, 9 pages.
Noizat, "Handbook of Digital Currency Chapter 22: Blockchain Electronic Vote," Elsevier Inc., David Lee Kuo Chuen (ed.), May 2015, 9 pages.
NXT, "Voting," nxt.org, website archived on Feb. 18, 2016 [retrieved May 31, 2022], https://web.archive.org/web/20160218021746/https://nxt.org/what-is-nxt/voting/, 3 pages.
Openchain, "Home Page," openchain.org, Dec. 22, 2015 [retrieved May 8, 2020], https://web.archive.org/web/20151222083734/https://www.openchain.org/, 18 pages.
OpenSSL Wiki, "Elliptic Curve Diffie Hellman," OpenSSL, https://wiki.openssl.org/index.php/Elliptic_Curve_Diffie_Hellman, Mar. 10, 2014 [retrieved Dec. 10, 2018], 5 pages.
OpenSSL Wiki, "EVP Key Agreement," OpenSSL, https://wiki.openssl.org/index.php/EVP_Key_Agreement, Apr. 28, 2017 [retrieved Dec. 10, 2018], 2 pages.
Perry, "Tapeke: Bitcoin Accounting for Non-Accountants," http://codinginmysleep.com/tapeke-bitcoin-accounting-for-non-accountants/, Jan. 21, 2015, 1 page.
Poon et al., "The Bitcoin Lightning Network: Scalable Off-Chain Instant Payments," https://www.bitcoinlightning.com/wp-content/uploads/2018/03/lightning-network-paper.pdf, Jan. 14, 2016 [retrieved Dec. 10, 2018], 59 pages.
Pornin, "Deterministic Usage of the Digital Signature Algorithm (DSA) and Elliptic Curve Digital Signature Algorithm (ECDSA)," Request for Comments: 6979, Independent Submission, Aug. 2013, 79 pages.

(56) References Cited

OTHER PUBLICATIONS

Pour, "Bitcoin multisig the hard way: Understanding raw P2SH multisig transactions," Dec. 20, 2014, https://www.soroushjp.com/2014/12/20/bitcoin-multisig-the-hard-way-understanding-raw-multisignature-bitcoin-transactions/, 19 pages.
Reddit, "Could Microsoft use the blockchain as a license key for it's software?," r/Bitcoin, Sep. 7, 2015 [retrieved May 8, 2020], https://www.reddit.com/r/Bitcoin/comments/3jz09c/could_microsoft_use_the_blockchain_as_a_license/?st=iw26pndq&sh=b862bf7d, 2 pages.
Reiner et al., "Bitcoin Wallet Identity Verification Specification," diyhpluswiki, http://diyhpl.us/-bryan/papers2/bitcoin/armory-verisign-bitcoin-wallet-identityspecification.pdf, Feb. 27, 2015 (retrieved Jan. 27, 2016), 24 pages.
Rockwell, "BitCongress—Process For Blockchain Voting & Law," retrieved from http://generalbitcoin.com/BitCongress_Whitepaper.pdf, Feb. 12, 2016, 8 pages.
Ryepdx et al., "Answer to 'What is the Global Registrar?'," Ethereum Stack Exchange, Feb. 26, 2016 [retrieved Jan. 30, 2017], http://ethereum.stackexchange.com/questions/1610/what-is-the-global-registrar, 3 pages.
Sams, "Ethereum: Turing-complete, programmable money," Cryptonomics, Feb. 1, 2014, https://cryptonomics.org/2014/02/01/ethereum-turing-complete-programmable-money, 4 pages.
Sanchez, "Marketplaces," GitHub, Jun. 10, 2015 [retrieved May 12, 2020], https://github.com/drwasho/openbazaar-documentation/blob/master/04%20Marketplaces.md, 37 pages.
Sanchez, "Protocol," Github, https://github.com/drwasho/openbazaar-documentation/blob/master/03%20Protocol.md, Jun. 15, 2015, 53 pages.
Sanchez, "Ricardian Contracts in OpenBazaar," Github, https://gist.github.com/drwasho/a5380544c170bdbbbad8, Jan. 2016, 12 pages.
Sardesai, "Coinffeine: A P2P Alternative to Centralised Bitcoin Exchanges," Cryptocoins News, Mar. 2, 2014 [retrieved Feb. 14, 2017], https://www.cryptocoinsnews.com/coinffeine-p2p-alternative-centralised-bitcoin-exchanges/, 5 pages.
Satoshi et al., "Connection Limits," Bitcoin Forum, Aug. 9, 2010, https://bitcointalk.org/index.php?topic=741.0;brev_next=prev, 2 pages.
Scott, "Counterparty to Create First Peer-to-Peer Digital Asset Exchange Platform," Cointelegraph, https://cointelegraph.com/news/counterparty_to_create_first_peer_to_peer_digital_asset_exchange_platform, Apr. 10, 2014 [retrieved Dec. 12, 2018], 2 pages.
Sevareid et al., "Use Case Asset Depository," Github.com, Jan. 11, 2016 version (last edited May 5, 2016) [retrieved Jan. 30, 2017], https://github.com/hyperledger/hyperledger/wiki/Use-Case-Asset-Depository, 4 pages.
Snow et al., "Factom: Business Processes Secured by Immutable Audit Trails on the Blockchain Version 1.2," factom.com, Apr. 25, 2018, 38 pages.
Stampery, "Features: Blockchain-based data certification at your fingertips," Stampery.com, https://stampery.com/features/, archived Mar. 5, 2016 [retrieved Nov. 3, 2016], 4 pages.
Sullivan et al., "Peer-to-peer Affine Commitment using Bitcoin," Carnegie Mellon University, Jun. 17, 2015, 54 pages.
Swan, "Blockchain: Blueprint for a New Economy," O'Reilly, Feb. 2015, 149 pages.
Swanson, "Great Chain of Numbers: Chapter 3: Next Generation Platforms," Great Wall of Numbers, Mar. 4, 2014 [retrieved Jan. 30, 2017], http://www.ofnumbers.com/2014/03/04/chapter-3-next-generation-platforms/, 25 pages.
Taiwanese Office Action dated Apr. 12, 2021, Patent Application No. 109142412, 5 pages.
Taiwanese Office Action dated Jul. 28, 2020, Patent Application No. 106105709, 9 pages.
Taiwanese Office Action dated Oct. 7, 2020, Patent Application No. 106105713, 4 pages.
Tasca et al., "Digital Currencies: Principles, Trends, Opportunities, and Risks," ECUREX Research Working Paper, Sep. 7, 2015 (Oct. 2015 version), 110 pages.
Abeikverdi et al., "Generating interactive, secure multiple ECC key pairs deterministically," StackExchange, http://crypto.stackexchange.com/questions/25191/generating-interactivesecure-multiple-ecc-key-pairs-deterministically, Apr. 23, 2015 [retrieved Dec. 26, 2016], 2 pages.
Akutsu et al., "Taking on the challenge of creating epoch-making services that impress users. For services that can share the excitement of competitions around the world," NTT Technical Journal 27(5):10-14, May 1, 2015.
Allison, "Symbiont's Adam Krellenstein: There's really only two smart contract systems—Ethereum's and ours," International Business Times, https://www.ibtimes.co.uk/symbionts-adam-krellenstein-theres-really-only-two-smart-contract-systems-ethereums-ours-1530490, Nov. 25, 2015 [retrieved Dec. 12, 2018], 4 pages.
Alonso et al., "Digital Economy Outlook," BBVA Research, Oct. 2015, https://www.bbvaresearch.com/wpcontent/uploads/2015/10/Digital_Economy_Outlook_Oct15_Cap1.pdf, 16 pages.
Andersen, "Blockchain Technology: A game-changer in accounting?," Deloitte & Touche GmbH Wirtschaftsprüfungsgesellschaft, Mar. 2016, 5 pages.
Andresen et al., "Relay OP_RETURN data TxOut as standard transaction type. #2738," Github, Jun. 4, 2013, https://github.com/bitcoin/bitcoin/pull/2738, 12 pages.
Anonymous, "Bitcoin Core 0.11 (ch 2): Data Storage—Bitcoin Wiki," retrieved from https://en.bitcoin.it/w/index.php?title=Bitcoin_core-0.11_(ch_2):_Data_Storage, Jan. 16, 2016, 10 pages.
Anonymous, "Bitcoin Developer Guide," Bitcoin Project, https://web.archive.org/web/20160515171209/https://bitcoin.org/en/developer-guide, May 15, 2016 [retrieved Mar. 13, 2019], 55 pages.
Anonymous, "Bitcoin Stats," retrieved from http://bitcoinstats.com/irc/bitcoin-dev/logs/2015/03/27, Mar. 27, 2015, 11 pages.
Anonymous, "Bitsquare—The decentralised bitcoin exchange," Bitsquare.io, Jan. 3, 2016, 14 pages.
Anonymous, "Homepage," website operational as of 2017 [retrieved Nov. 30, 2020], https://www.coinffeine.com/, 2 pages.
Antonopoulos et al., "Bitcoin Book," GitHub, retrieved from https://github.com/bitcoinbook/bitcoinbook, Jun. 8, 2017, 4 pages.
Antonopoulos, "Mastering Bitcoin—Unlocking Digital Cryptocurrencies," O'Reilly Media, Inc., Dec. 20, 2014, 282 pages.
Australian Office Action for Application No. 2017223158, dated Jun. 22, 2021, 7 pages.
bitcoininvestor.com, "All-Star Panel: Ed Moy, Joseph VaughnPerling, Trace Mayer, Nick Szabo, Dr. Craig Wright," YouTube, https://youtu.be/LdvQTwjVmrE, Bitcoin Investor Conference, Oct. 29, 2015 [retrieved Dec. 12, 2018], 1 page.
Bitfreak! et al., "Understanding Stealth Addresses/Payments," Bitcoin Forum, Jun. 10, 2015 (retrieved Jun. 16, 2020), https://bitcointalk.org/index.php?topic=1086498.0, 8 pages.
BitFury Group, "Smart Contracts on Bitcoin Blockchain," BitFury Group Limited, Aug. 13, 2015 (updated Sep. 4, 2015), http://bitfury.com/content/5-white-papers-research/contracts-1.1.1.pdf, 20 pages.
Block_Chan, "Tweet dated Nov. 7, 2018," Twitter, Nov. 7, 2018, https://twitter.com/block_chan/status/1060336404163584000, 1 page.
Bluematt, http://bitcoinstats.com/irc/bitcoin-dev/logs/2015/03/16.
Bradbury, "Developers Battle Over Bitcoin Block Chain," Coindesk, http://www.coindesk.com/developers-battle-bitcoin-block-chain/, Mar. 25, 2014, 3 pages.
Brown et al., "Standards for Efficient Cryptography 1: Elliptic Curve Cryptography Version 2.0," Certicom Research, May 21, 2009, 144 pages.
Brown et al., "Standards for Efficient Cryptography 2: Recommended Elliptic Curve Domain Parameters Version 2.0," Certicom Research, Jan. 27, 2010, 37 pages.
Burgess et al., "The Promise of Bitcoin and the Blockchain," Consumers' Research, Jul. 13, 2015, 97 pages.
Buterin et al., "Ethereum Development Tutorial," GitHub, Jul. 1, 2014 [retrieved Jul. 20, 2021], https://github.com/ethereum/wiki/wiki/ethereum-development-tutorial/0c1f501ea03a787910049b03723f1bfd7a14c9c6, 13 pages.
Buterin, "Bitcoin Multisig Wallet: The Future Of Bitcoin," Bitcoin Magazine, Mar. 13, 2014 [retrieved May 12, 2020], https://bitcoinmagazine.com/articles/multisig-future-bitcoin-1394686504, 7 pages.

(56) References Cited

OTHER PUBLICATIONS

Buterin, "Secret Sharing DAOs: The Other Crypto 2.0," Ethereum Blog, Dec. 26, 2014 [retrieved Nov. 21, 2019], https://ethereum.github.io/blog/2014/12/26/secret-sharing-daos-crypto-2-0/, 10 pages.
Campagna et al., "Standards for Efficient Cryptography 4: Elliptic Curve Qu-Vanstone Implicit Certificate Scheme (ECQV) Version 1.0," Certicom Research, Jan. 24, 2013, 32 pages.
Charlon et al., "Open-Assests-Protocol," Github.com, Nov. 17, 2015 [retrieved Jan. 30, 2017], https://github.com/OpenAssets/open-assets-protocol/blob/master/specification.mediawiki, 5 pages.
Christidis et al., "Blockchains and Smart Contracts for the Internet of Things," IEEE Access 4(1):2292-2303, May 10, 2016.
Coinprism, "80 bytes OP_Return explained," Coinprism Blog, http://blog.coinprism.com/2015/02/11/80-bytes-op-return/, Feb. 11, 2015 [retrieved Dec. 21, 2018], 8 pages.
Corallo, "[Bitcoin-development] Relative Checklocktimeverify (was CLTV proposal)," Linux Foundation, https://lists.linuxfoundation.org/pipermail/bitcoin-dev/2015-May/007858.html, May 4, 2015 [retrieved Dec. 12, 2018], 3 pages.
Counterparty, "Home Page," Counterparty, copyright 2018 [retrieved Jan. 13, 2020], counterparty.io, 3 pages.
Countyparty, "The Counterparty Protocol," retrieved from https://github.com/jsimnz/Counterparty/blob/master/README.md, Jan. 8, 2014, 6 pages.
crpit.com, FYJC Mumbai 11th Online Admission 2021—Part—1, 2 Admission Form (mumbai.11thadmission.Org.in), https://crpit.com, Jul. 6, 2021 8 pages.
Danda et al., "hd-wallet-addrs," GitHub, https://github.com/dan-da/hd-wallet-addrs, Dec. 30, 2015 [retrieved Mar. 11, 2016], 7 pages.
Danda et al., "Is there any service/api for deriving HD wallet addresses from a master public key?," StackExchange, http://bitcoin.stackexchange.com/questions/38887/is-there-any-service-api-for-deriving-hdwallet-addresses-from-a-master-public-k, Jul. 30, 2015, 2 pages.
Danda, "Help / FAQ," MyBitPrices, https://mybitprices.info/hd-wallet-addrs.html, Jan. 1, 2016 [retrieved Mar. 11, 2016], 4 pages.
Das, "As Exchanges Pause Withdrawals, Chinese Bitcoin Investors Switch to P2P Trading," CCN, Feb. 13, 2017 [retrieved May 12, 2020], https://www.ccn.com/chinese-bitcoin-investors-switch-p2p-trading-exchanges-pause-withdrawals/, 4 pages.
Dash et al., "bips/bip-0047.mediawiki," Github, Feb. 24, 2016 (retrieved Jun. 16, 2020), https://github.com/bitcoin/bips/blob/15c0b250cb5b77eba3ea709b082d7da6a310d991/bip-0047.mediawiki, 16 pages.
Decker, "[BIP] Normalized transaction IDs," Bitcoin-Dev, https://bitcoin-development.narkive.com/DjOYjEig/bip-normalized-transaction-ids, Oct. 19, 2015 [retrieved Dec. 12, 2018], 16 pages.
Dixon, "True peer-to-peer currency exchange?," DGC Magazine, Jul. 2, 2013 [retrieved May 12, 2020], http://dgcmagazine.com/true-peer-to-peer-currency-exchange/, 6 pages.
Dorier, "Colored Coins and Ricardian Contracts," Coinprism Blog, Dec. 10, 2014 [retrieved Jan. 30, 2017], http://blog.coinprism.com/2014/12/10/colored-coins-and-ricardian-contracts/, 9 pages.
Drcode, "New Kid on the Blockchain," Hacker News, https://news.ycombinator.com/item?id=11372455, Mar. 28, 2016 [Dec. 12, 2018], 32 pages.
Durback, "Standard BIP Draft: Turing Pseudo-Completeness," Bitcoin-Dev, Dec. 10, 2015, https://bitcoin-development.narkive.com/uRciVtAQ/standard-bip-draft-turing-pseudo-completeness, 11 pages.
Eragmus et al., "Time to lobby Bitcoin's core devs: "SF Bitcoin Devs Seminar—Scalability to billions of transactions per day, satoshi-level Micropayments, near-zero risk of custodial theft, & Instant transactions" . . . but only w/ a malleability-fixing soft fork," Reddit r/bitcoin, https://www.reddit.com/r/Bitcoin/comments/2z2I91/time_to_lobby_bitcoins_core_devs_sf_bitcoin_devs/, Mar. 14, 2015 [Dec. 12, 2018], 21 pages.
Ethereum, "EIP-20: Token Standard," retrieved from https://eips.ethereum.org/EIPS/eip-20, Nov. 19, 2015, 5 pages.
European Communication pursuant to Article 94(3) EPC dated Jan. 2, 2020, Patent Application No. 18166910.2-1218, filed Feb. 16, 2017, 4 pages.
European Communication pursuant to Article 94(3) EPC dated Jul. 1, 2019, Application No. 17707121.4-1218, filed Feb. 14, 2017, 6 pages.
Extended European Search Report dated Jul. 18, 2018, Patent Application No. 18166910.2-1218, filed Feb. 16, 2017, 8 pages.
Familiar et al., "Transcript for #bitcoin-dev Mar. 27, 2015," BitcoinStats, http://bitcoinstats.com/irc/bitcoin-dev/logs/2015/03/27, Mar. 27, 2015 [archived version Jun. 27, 2016], 11 pages.
Zindros, Dionysis, "A Pseudonymous Trust System for a Decentralized Anonymous Marketplace", web-of-trust.md, https://gist.github.com/dionyziz/e3b296861175e0ebea4b, Jul. 2, 2014, 30 pages.
Subramanian, et al., "The State of Cryptocurrencies, Their Issues and Policy Interactions", International Information Management Association, vol. 24, No. 24, No. 3, 2015, pp. 25-40.
Greenspan, Dr. Gideon, "MultiChain Private Blcokchain", White Paper, Jun. 2015, 17 pages.
Atsushi Takeda et al., "System Architecture for Decentralized Authentication in P2P Network", IPSJ SIG technical Reports, Information Processing Society of Japan, Jun. 12, 2008, vol. 2008 No. 54, [ISSN] 0919-6072, pp. 63-68.
Manabu Takata et al., "Nikkei BP Mook, FinTech Revolution, Financial Common Sense Dissolved by Technology", Nikkei Business Publications, Inc., Jan. 27, 2016, ISBN: 978-4-8222-7188-6, pp. 44-47.
Swanson, Tim, "Watermarked Tokens and Pseudonymity on Public Blockchains", Nov. 4, 2015, 78 pages.
Bitfury Group, "Public Versus Private Blockchains", Part 2: Permissionless Blackchains, in collaboration with Jeff Garzik, Version 1.0, Oct. 20, 2015, 20 pages.
UK Commercial Search Report dated Jun. 9, 2016, Patent Application No. GB1603114.8 , 4 pages.
International Search Report and Written Opinion dated Mar. 29, 2017, Patent Application No. PCT/IB2017/050821, 13 pages.
Bitcoin Forum, "Counterparty—Pioneering Peer-to-Peer Finance", https://bitcointalk.org/index.php?topic=395761.0, Feb. 1, 2014, 7 pages.
Buterin, "Introducing Ethereum Script 2.0", Ethereum Foundation Blog, Feb. 3, 2014, 9 pages.
Brown, "On Distributed Satabases and Distributed Ledgers", Thoughts on the Future of Finance, Nov. 8, 2016, https://gendal.me/page/3/, 44 pages.
Goldfeder et al., "Escrow Protocols for Cryptocurrencies: How to Buy Physical Goods Using Bitcoin," retrieved from http://stevengoldfeder.com/papers/escrow.pdf, Jul. 26, 2018, 27 pages.
International Search Report and Written Opinion dated Aug. 3, 2018, Patent Application No. PCT/IB2018/053289, 10 pages.
UK Commercial Search Report dated Jun. 12, 2017, Patent Application No. GB510912, 6 pages.
UK IPO Search Report dated Oct. 9, 2017, Patent Application No. GB1707788.4, 6 pages.
Drwasho, "Openbazaar Documentation", Github, Jun. 2015, 53 pages.
Bluematt, "Contract", Bitcoin Wiki, Oct. 22, 2015, 12 pages.
UK IPO Search Report dated Dec. 21, 2016, Patent Application No. GB1607484.1, 4 pages.
Gutoski et al., "Hierarchical Deterministic Bitcoin Wallets That Tolerate Key Leakage", Lecture Notes in Computer Science book series (LNSC, vol. 8975), Jan. 1, 2015, 9 pages.
Mirzadeh et al., "CPFP: An Efficient Key Management Scheme for Large Scale Personal Networks", IEEE, 2008, 6 pages.
Menezes et al., "Handbook of Applied Cryptography," CRC Press, Oct. 16, 1996, 811 pages.
Deloitte, "Blockchain Technology A Game-changer in Accounting", Mar. 2016, 5 pages.
Lazarovich, Amir, "Invisible Ink: Blockchain for Data Privacy", May 8, 2015, 85 pages.
Gauthierdickey, et al. "Secure Peer-to-Peer Trading in Small and Large Scale Multiplayer Games", Multimedia Systems, Apr. 29, 2014, 13 pages.

(56) References Cited

OTHER PUBLICATIONS

Feng et al., "A Next Generation Cryptocurrency Platform Ethereum and Its Evaluation", Oct. 14, 2015, 12 pages.
Ramaswami, U., et al., "Genotype and Phenotype in Hypochondroplasia", 1998, Mosby, Inc., 5 pages.
UK Commercial Search Report mailed Jan. 18, 2017, Patent Application No. GB510135, filed Mar. 16, 2016, 5 pages.
Wikipedia, "Public-key Cryptography", Zosterops (talk contribs), Jul. 5, 2015, Retrieved from https://en.wikipedia.org/w/index.php?title=Public-key_cryptography$oldid=670016308, 14 pages.
The Institute of Electrical and Electronics Engineers, Inc., "IEEE P1363, D1-pre Draft Standard for Public Key Cryptography", Prepared by the 1363 Working Gorup of the C/MSC Committee, Jun. 2009, 362 p.
Omnilayer, Omni Protocol Specification (formerly Mastercoin), retrieved from https://github.com/OmniLayer/spec/blob/9978cc3984ae0b6e51216c4ae74042fc4097b993/README.md on Apr. 19, 2024, 58 pages.
Vroblefski et al., "Managing User Relationships in Hierarchies for Information System Security", Science Direct, Decision Support System 43, 2007, 12 pages.
Wikipedia, "Diffie-Hellman Key Exchange," retrieved from https://en.wikipedia.org/w/index.php?title=Diffie%E2%80%93Hellman_key_exchange&oldid=759611604, Jan. 2017, 10 pages.
Nikkei Business Publications, Inc., "Blockchain & Bitcoin," 2016, 4 pages.
Bitcoin Wiki, "Contract," Bitcoin Wiki, https://en.bitcoin.it/w/index.php?title=Contract&oldid=59172, May 22, 2011 (updated dated Oct. 22, 2015) [retrieved Jan. 8, 2024], 2 pages.
Fromknecht Conner, et al., "A Decentralized Public Key Infrastructure with Identity Retention," Nov. 11, 2024, 16 pages.
Buterin, "Ethereum White Paper", A Next Generation Smart Contract & Decentralized Application Platform, 2014, 36 pages.
Fuchita, Yasuyuki, "Special Feature: Innovation and Finance -Blockchain and Financial Transaction Innovation," Nomura capital markets quarterly, Japan, Nomura Institute of Capital Markets Research, Nov. 1, 2015, vol. 19, No.2 (consecutive No. of issue 74), (with English Translation), 59 pages.
Gutoski et al., "Hierarchical Deterministic Bitcoin Wallets that Tolerate Key Leakage," Springer Link, Conference Paper, Lecture Notes in Computer Science book series LNCS, vol. 8975, Jul. 16, 2015, 14 pages.

\* cited by examiner

METHOD AND SYSTEM FOR EFFICIENT TRANSFER OF CRYPTOCURRENCY ASSOCIATED WITH A PAYROLL ON A BLOCKCHAIN THAT LEADS TO AN AUTOMATED PAYROLL METHOD AND SYSTEM BASED ON SMART CONTRACTS

CROSS-REFERENCE TO RELATED APPLICATIONS

This application is a continuation of U.S. patent application Ser. No. 16/079,083, filed Aug. 22, 2018, entitled "METHOD AND SYSTEM FOR EFFICIENT TRANSFER OF CRYPTOCURRENCY ASSOCIATED WITH A PAYROLL ON A BLOCKCHAIN THAT LEADS TO AN AUTOMATED PAYROLL METHOD AND SYSTEM BASED ON SMART CONTRACTS," which is a 371 Nationalization Patent Application of International Patent Application No. PCT/IB2017/050867, filed Feb. 16, 2017, entitled "METHOD AND SYSTEM FOR EFFICIENT TRANSFER OF CRYPTOCURRENCY ASSOCIATED WITH A PAYROLL ON A BLOCKCHAIN THAT LEADS TO AN AUTOMATED PAYROLL METHOD AND SYSTEM BASED ON SMART CONTRACTS," which claims priority to United Kingdom Patent Application No. GB1603117.1, filed Feb. 23, 2016, entitled "DETERMINING A COMMON SECRET FOR TWO BLOCKCHAIN NODES FOR THE SECURE EXCHANGE OF INFORMATION," United Kingdom Patent Application No. 1603125.4, filed Feb. 23, 2016, entitled "UNIVERSAL TOKENISATION SYSTEM FOR BLOCKCHAIN BASED CRYPTOCURRENCIES," United Kingdom Patent Application No. 1604495.0, filed Mar. 16, 2016, entitled "METHOD AND SYSTEM FOR EFFICIENT TRANSFER OF CRYPTOCURRENCY ASSOCIATED WITH A PAYROLL ON A PEER-TO-PEER DISTRIBUTED LEDGER THAT LEADS TO A AUTOMATED PAYROLL METHOD AND SYSTEM BASED ON SMART CONTRACTS," and United Kingdom Patent Application No. 1619301.3, filed Nov. 15, 2016, entitled "DETERMINING A COMMON SECRET FOR TWO BLOCKCHAIN NODES FOR THE SECURE EXCHANGE OF INFORMATION," the disclosures of which are incorporated herein by reference in their entirety.

TECHNICAL FIELD

The present disclosure relates generally to blockchain technologies, cryptography and cryptocurrencies. In particular, it relates to a secure and improved method of transfer between a multiple of nodes associated with a computer-based system such as, but not limited to, a payroll system. The transfer may be a transfer of a quantity of cryptocurrency

BACKGROUND

Many computer-based systems store and process data relating to a plurality of entities such as individuals. This data must be stored, processed and transmitted in a secure and efficient manner. In many instances, a record of the data and any changes made to it, must be stored in an immutable and permanent manner for future reference. For example, a payroll of an entity typically includes a record of the entity's employees and wages allocated to the employees. Information in relation to tax withheld and other contributions such as superannuation may be included on the payroll. Details about the employees' leave entitlements or benefits may also be included on the payroll.

Blockchain technologies can be used to store data in an immutable and permanent manner. A blockchain is a consensus-based, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc) while being more versatile in their applications.

One area of current research is the use of the blockchain for the implementation of "smart contracts". These are computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results.

Another area of blockchain-related interest is the use of 'tokens' (or 'coloured coins') to represent and transfer control or ownership of real-world entities via the blockchain. A potentially sensitive or secret item can be represented by the token which has no discernable meaning or value. The token thus serves as an identifier that allows the real-world item to be referenced from the blockchain.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

In this document we use the term 'blockchain' to include all forms of electronic, computer-based, distributed ledgers. These include, but are not limited to consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

SUMMARY

The present invention is defined in the appended claims.

Embodiments and aspects of the present invention may provide a computer-implemented method for efficient and/or secure transfer of cryptocurrency or other digital asset. Additionally or alternatively, the invention may be described as a tokenisation method, a security method and/or a method for controlling an exchange or transfer on a blockchain. The exchange or transfer may relate to a digital asset such as, for example, a quantity of cryptocurrency, or a token that is representative of or associated with an entity. The tokenised entity may be stored on or off the blockchain. The invention may provide one or more systems for implementation of the methods of the invention.

The invention may require the interaction and intercommunication of various distinct and separate computer-based resources, such as one or more user devices and a distributed computer system (blockchain) which includes computing nodes arranged to execute blockchain-related software and protocols. The invention may comprise a computer-implemented system arranged to implement or execute one or more of the methods described herein.

The cryptocurrency may be associated with a data processing and/or storage resource, such as a payroll, on a peer-to-peer distributed ledger (blockchain). The transfer may be between a multiple of nodes, including a first transfer from a first node to a second node.

The method may comprise one or more of the following steps:

receiving a first request to transfer a first quantity of cryptocurrency associated with the first transfer from the first node to the second node;

determining a second node master public key associated with the second node, wherein the second node master public key forms a cryptographic pair with a second node master private key;

determining a generator value;

determining a second node second public key based on at least the second node master public key and the generator value;

determining a first output script, wherein the first output script is based on:

at least a first metadata that includes information associated with the first transfer; and the second node second public key;

sending, over a communications network, a first data output to a peer-to-peer distributed ledger based on:

an indication of the first transfer from the first node to the second node; and the first output script, wherein the first output script is associated with the first quantity of cryptocurrency.

The present disclosure may allow a public peer-to-peer distributed ledger, such as the bitcoin Blockchain, to be used as the repository of accounts related to payroll information of an employer entity.

The first metadata may be based on information provided by the first node in the first request, wherein the metadata comprises information associated with the payroll and the second node. The first metadata may comprise a hash of the information associated with the payroll and the second node.

The method may further comprise a first node master public key associated with the first node, wherein the first node master public key forms a cryptographic pair with a first node master private key.

The method may further comprise at least one first node additional public key or at least one second node additional public key determined based on at least the first node master public key and the generator value or the second node master public key and the generator value respectively. A first node second public key may be determined based on at least the first node master public key and the generator value, wherein the first node second public key forms a cryptographic pair with a first node second private key.

The first node second public key or first node additional public key may be associated with a tax withheld of the second node. The second node second public key or second node additional public key may be associated with a tax withheld of the second node. The first node second public key or first node additional public key may be associated with a superannuation contribution of the second node. The second node second public key or second node additional public key may be associated with a superannuation contribution of the second node. The first node second public key or first node additional public key may be associated with a house mortgage payment. The second node second public key or second node additional public key may be associated with a house mortgage payment. The first node second public key or first node additional public key may be associated with a college fund. The second node second public key or second node additional public key may be associated with a college fund.

The generator value may be based on a string associated with the first node. Alternatively, the generator value may be based on Unix time and a nonce. In yet another alternative the generator value may change based on a payment period.

The generator value may be retrieved from a data store 17. Alternatively, the generator value may be received from a third party.

The generator value may be used to determine a common secret based on the second node second private key and the first node second public key, wherein the second node has the same common secret based on the first node second public key and the second node second private key.

A method of securely transmitting at least part of the first metadata between the first node and the second node with symmetric-key algorithm, wherein the method comprises:

determining a symmetric-key based on the common secret determined according to the method described above;

encrypting at least part of the first metadata with the symmetric-key, to an encrypted at least part of the first metadata; and sending, over the communications network, the encrypted at least part of the first metadata from the first node to the second node.

A method of securely transmitting the first output script or information associated with the payroll and the second node between the first node and the second node with symmetric-key algorithm, wherein the method comprises:

determining a symmetric-key based on the common secret determined according to the above described method;

encrypting at least part of the first output script or information associated with the payroll and the second node with the symmetric-key, to an encrypted first output script or encrypted information associated with the payroll and the second node; and sending, over the communications network, the encrypted first output script or encrypted information associated with the payroll and the second node from the first node to the second node.

A method of verifying the first transfer as described above, the method comprising:

receiving a request to confirm the first transfer;

determining the first data output corresponding to the first transfer of the first quantity of cryptocurrency;

receiving, over the communications network, at least part of the first data output from the peer-to-peer distributed ledger;

determining, from the first data output, the indication of the first transfer;

verifying that the indication of the first transfer corresponds to the first transfer in the request; and sending an output indicative of the result of verifying.

The method may further comprise a first token associated with the first quantity of cryptocurrency. The first token may comprise information associated with employment rights and benefits of the first node or second node. The first token may be transferred from the first node to the second node.

A computer program comprising machine-readable instructions to cause a processing device to implement any one of the methods described above.

A device including a processing device to perform the method according to any one of the methods described above.

A system for efficient transfer of cryptocurrency associated with a payroll on a peer-to-peer distributed ledger between a multiple of node, including a first transfer from a first node to a second node, the system comprising:

a first processing device configured to:

receive a first request from the first node to transfer a first quantity of cryptocurrency associated with the first transfer from the first node to the second node;

determine a second node master public key associated with the second node, wherein the second node master public key forms a cryptographic pair with a second node master private key;

determine a generator value;

determine a second node second public key based on at least the second node master public key and the generator value;

determine a first output script, wherein the first output script is based on:

at least a first metadata that includes information associated with the first transfer; and the second node public key;

send, over a communications network, a first data output to a peer-to-peer distributed ledger based on:

an indication of the first transfer from the first node to the second node; and the first output script, wherein the first output script is associated with the first quantity of cryptocurrency.

Any feature described herein in respect of one aspect or embodiment of the invention may also be application or one or more other aspects or embodiments.

BRIEF DESCRIPTION OF DRAWINGS

Examples of the present disclosure will be described with reference to.

DESCRIPTION OF EMBODIMENTS

Figure 1:
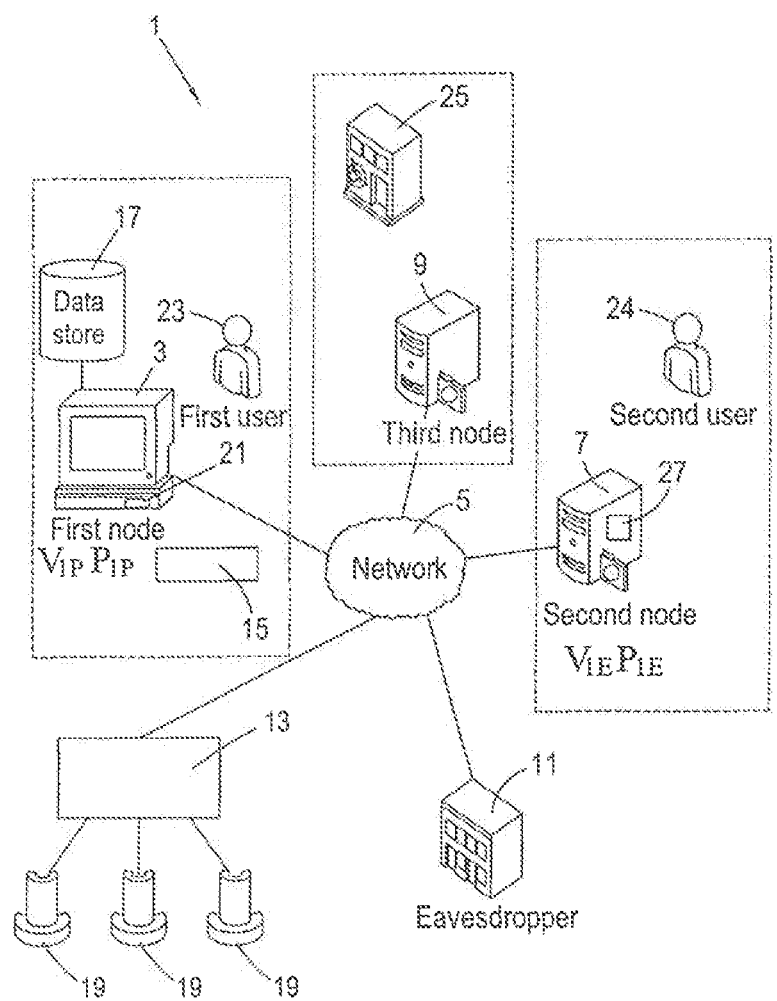
FIG. 1 is a schematic diagram of an example system to transfer cryptocurrency between a multiple of nodes associated with a payroll.

The present disclosure generally relates to methods and apparatus for utilising a peer-to-peer (P2P) distributed ledger, such as the Bitcoin blockchain, to enable the transfer of cryptocurrency between a multiple of nodes associated with a data storage and processing system such as, for example, a payroll.

Whilst embodiments described below may refer specifically to transactions that occur on the bitcoin Blockchain (referred to herein as the Blockchain), it will be appreciated that the present invention may be implemented using other P2P distributed ledgers. The Blockchain is used below to describe aspects of the invention for simplicity only due to its high level of standardisation and large quantity of associated public documentation.

Bitcoin and the Blockchain

As described above and well known in the art, the Blockchain is a transaction ledger or database which is distributed across networked nodes participating in a system based on the bitcoin protocol. Each bitcoin transaction is broadcast to the network, the transactions are confirmed and then aggregated into blocks. The blocks are then included on the Blockchain.

A full copy of a cryptocurrency's P2P distributed ledger contains every transaction ever executed in the cryptocurrency. Thus, a continuously growing list of transactional data records is provided. Since each transaction entered onto the Blockchain is cryptographically enforced, the Blockchain is hardened against tampering and revision, even by operators of the data store nodes.

Due to the transparency of the Blockchain, transaction histories are publicly available for each transaction. It is a further advantage of the Blockchain that the transaction and the record of the transaction are the same, i.e. the record of the transaction is embedded within the transaction.

In this way, the information relating to the transaction is captured in the actual transaction. This record is permanent and immutable, and each transaction that is conducted using bitcoin is therefore not only facilitated by the Blockchain, but also immutably recorded in the Blockchain. This therefore removes the requirement for a third party to keep the transaction record on a separate database.

Pay-to-Script-Hash and Multi-Signature

Whilst embodiments below may refer specifically to transactions that use the pay-to-script-hash (P2SH) method of the bitcoin protocol, it will be appreciated that the present invention may be implemented using another method of the bitcoin protocol (or an alternative protocol) such as the pay-to-public-key-hash method.

Each transaction record on the Blockchain comprises a script including information indicative of the transaction and a number of public keys. These public keys may be indicative of, and associated with, the sender and recipient of the cryptocurrency. A script can be considered as a list of instructions recorded with each transaction record on the Blockchain that describes how a user may gain access to the cryptocurrency specified in the transaction record.

As background, in a standard P2SH method of the bitcoin protocol, the output script, or redeem script, may take the form:
<NumSigs PubK1 PubK2 . . . PubK15 NumKeys OP_CHECKMULTISIG>
where NumSigs is the number "m" of valid signatures required to satisfy the redeem script to unlock the transaction; PubK1, PubK2 . . . PubK15 are the public keys that correspond to signatures that unlock the transaction (up to a maximum of 15 public keys) and NumKeys is the number "n" of public keys.

To redeem the above redeem script, at least a number "m" of signatures corresponding to the public keys are required. In some examples, the order of the public keys is important and the number "m" out of "n" signatures for signing must be done in sequence. For example, consider where "m" is 2 and "n" is 15. If there are two signatures are available for use, Sig1 (corresponding to PubK1) and Sig 15 (corresponding to PubK15), the redeem script must be signed by Sig1 first followed by Sig15.

While the exemplary embodiments below refer to the bitcoin Blockchain as the public ledger, it is to be understood the disclosure also applies to any public ledger that utilises a cryptocurrency.

Overview of the System

A method, device and system to transfer cryptocurrency between a multiple of nodes associated with a payroll will now be described.

FIG. 1 illustrates a system 1 that includes a first node 3 that is in communication with, over a communications network 5, a second node 7. The first node 3 has an associated first processing device 21 and the second node 5 has an associated second processing device 27. The first and second nodes 3, 7 may include an electronic device, such as a computer, tablet computer, mobile communication device, computer server etc.

A P2P distributed ledger 13 to record transactions is also illustrated in FIG. 1. The P2P distributed ledger may be associated with one or more processing devices 19 to receive and record transactions. As described above, an example of a P2P distributed ledger is the bitcoin Blockchain. Therefore, in the context of the Blockchain, the processing devices 19 associated with the P2P distributed ledger may be processing devices used by "miners".

The first node 3 is associated with a first user 23 and the second node 7 is associated with a second user 24. The first node 3 may receive a first request from the first user 23 to transfer a first quantity of cryptocurrency. In one example, the first user 23 is an employer and the second user 24 is an employee of the employer 23 and the transfer of the first quantity of cryptocurrency is remuneration (i.e. salary or wage). In further examples, the second user 24 may be a government body such as the Australian Tax Office or a superannuation fund.

In another example, the first request from the first node 3 is received at a third node 9. The third node 9 may represent an issuer or service provider 25 of the first and second nodes 3, 7. The third node 9 may be involved in facilitating the transfer of cryptocurrency.

Figure 2:
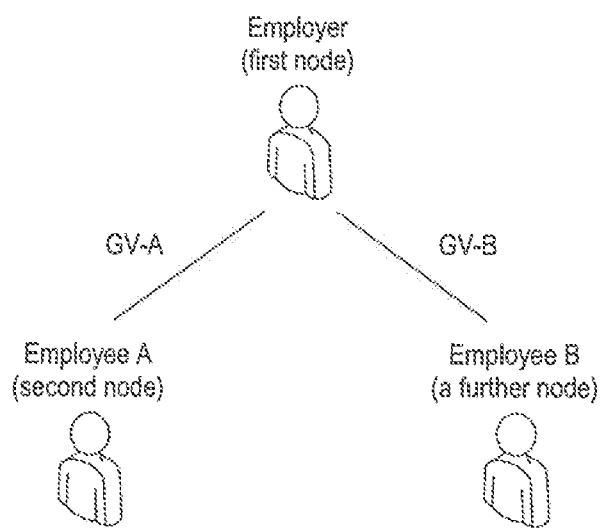
FIG. 2 is a schematic diagram of users at a multiple of nodes associated with a payroll.

FIG. 2 illustrates two exemplary employees at a second node 7 and a further node, where these employees are associated with the employer 23 at the first node 3.

While the exemplary embodiments below refer to the first node 3 as performing the methods it is to be understood the disclosure may also be adapted or modified to be performed by other nodes.

Figure 3:
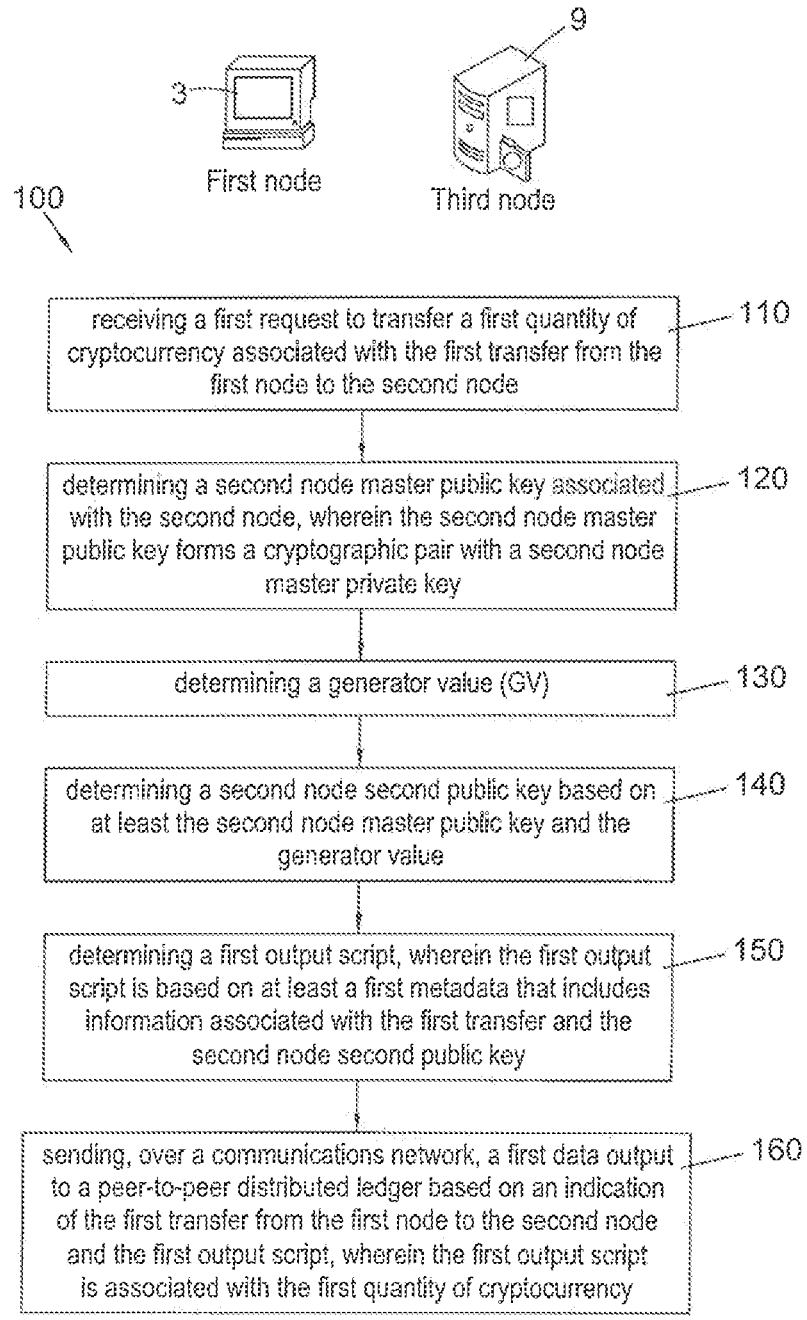
FIG. 3 is a flow chart of a computer-implemented method for transferring cryptocurrency between a multiple of nodes associated with a payroll.

The method 100 as illustrated in FIG. 3 includes receiving 110 a first request from the first node 3 to transfer a first quantity of cryptocurrency associated with the first transfer from the first node 3 to the second node 7. The first quantity of cryptocurrency may be associated with a payroll of the first node 3. For example, the first quantity of cryptocurrency may represent payment to a second user 24 (employee) from the first user 23 (employer).

The method 100 also includes determining 120 a second node master public key associated with the second node 7. The second node master public key forms a cryptographic pair with a second node master private key. The method 100 also includes determining 130 a generator value (GV). The generator value may be based on a message (M) that is shared between the first and second nodes, which may include sharing the message over the communications network 5. The method 100 also includes determining 140 a second node second public key based on at least the second node master public key and the generator value (GV).

The method 100 also includes determining 150 a first output script based on at least a first metadata that includes information associated with the first transfer and the second user second public key. In one example, the first output script may be a first redeem script using the P2SH method of the bitcoin protocol. In another example, the first output script may be a first output script using the pay-to-public-key-hash method of the bitcoin protocol.

The method 100 also includes sending 160, over a communications network 5, a first data output to a P2P distributed ledger 13 based on an indication of the first transfer from the first node 3 to the second node 7 and the first output script. The indication of the first transfer records the underlying first quantity of cryptocurrency has been transferred to the second node 7. The first data output may also comprise the first output script or a hash of the first output script.

A detailed example of the method will now be described.

Receiving a Request 110

As described above the method 100 includes receiving 110 a first request to transfer a first quantity of cryptocurrency associated with the first transfer from the first node 3 to the second node 7. In one example, the third node 9 or issuer/service provider 25 receives the request from the employer 23 at the first node 3. For instance, personnel from the human resources department associated with the first node 3 may send the request to the third node 9 or issuer/service provider 25.

In another example, personnel from the human resources department associated with the first node 3 may send the request to the payroll department associated with the first node 3.

The request may include details associated with the first quantity of cryptocurrency, for example the exact amount of the first quantity of cryptocurrency. The request may further include details of the recipient of the first quantity of cryptocurrency, for example employee details. Employee details may include information about the employee's position at the employer, pay period and pay rate.

Determining a Second Node Master Public Key 120

As also described above the method 100 further includes determining 120 a second node master public key associated with the second node (e.g. an employee's public key), wherein the second node master public key forms a cryptographic pair with a second node master private key. In one example, the second node master public key is received over the communications network 5 from the second node 7. In another example, the second node master public key is retrieved from a data store 17. In yet another example, the second node master public key is received from a third node 9 or the issuer/service provider 25.

Determining the Generator Value 130

As described above, the method 100 includes determining 130 a generator value and further includes determining 140 a second node second public key by way of the second node master public key and the generator value (GV). The present disclosure may also determine a first node second public key based on the first node master public key and the generator value (GV).

Figure 4:
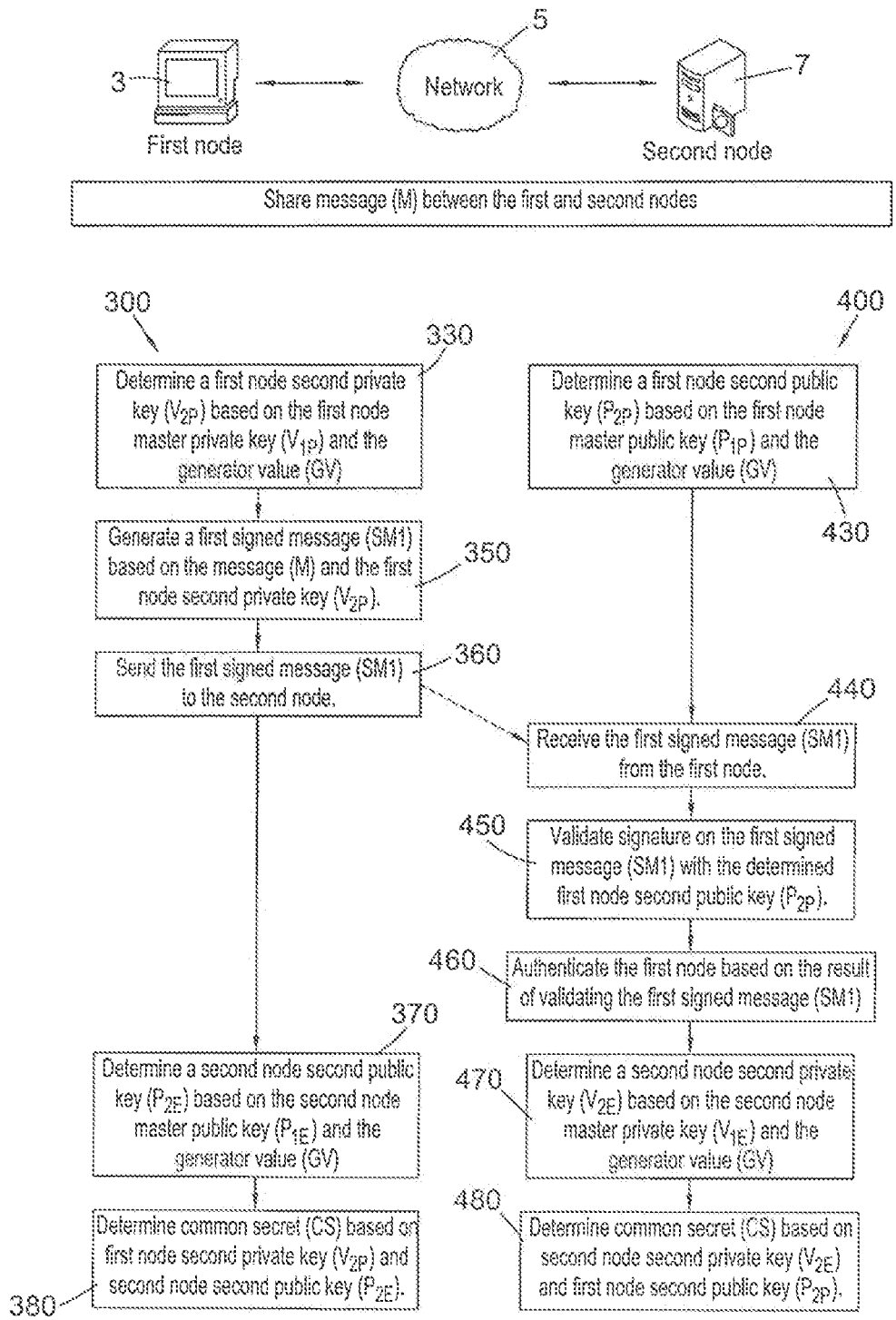
FIG. 4 is a flow chart of computer-implemented methods for determining a common secret.

To determine the generator value (GV) the nodes 3, 7 may perform steps of respective methods 300, 400 as illustrated in FIG. 4.

The generator value (GV) may be random, pseudo random, or user defined. In one example, the generator value (GV) is based on a string associated with the first node 3. For example, the string may be the identification number of the second user 24 (e.g. an employee identification number). In a further example the generator value (GV) may be a concatenation of the string as described above with one or more values. For instance, the value may be the date that the first request is received.

A further example of the value may be a string indicating the purpose of the key being derived. For instance, if the key is to be used to transfer cryptocurrency associated with tax withheld of the second user 24, the value may comprise a string that includes the word 'tax'.

In yet another example, the generator value (GV) is based on Unix time and a nonce. In a further example the generator value (GV) changes based on a payment period associated with the first node and the second node. For example, if the payment period is fortnightly, the generator value (GV) may change on a fortnightly basis.

Figure 5:
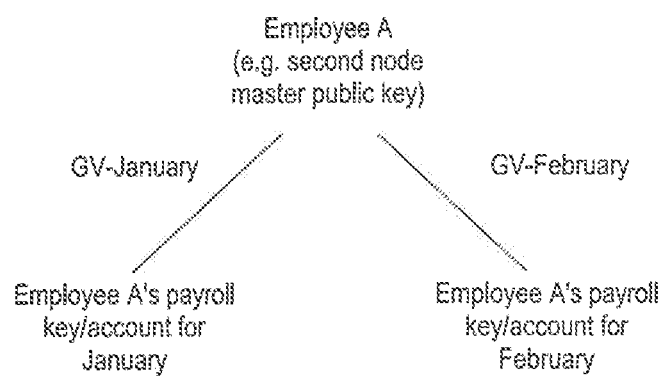
FIG. 5 is a schematic diagram of an employee's accounts associated with a payroll.

FIG. 5 illustrates two accounts that are associated with an employee A located at the second node 7. The first account is for the month of January and has a designated generator value GV-January, and the second account is for the month of February and has a designated generator value GV-February.

In some examples, the generator value may be arbitrary. However, it is to be appreciated that the generator value may have selective values (such as Unix time, etc) that may be useful in some applications.

The generator value may be retrieved from a data store 17. In another example the generator value is received from a third party.

Generating a Message (M)

Figure 6:
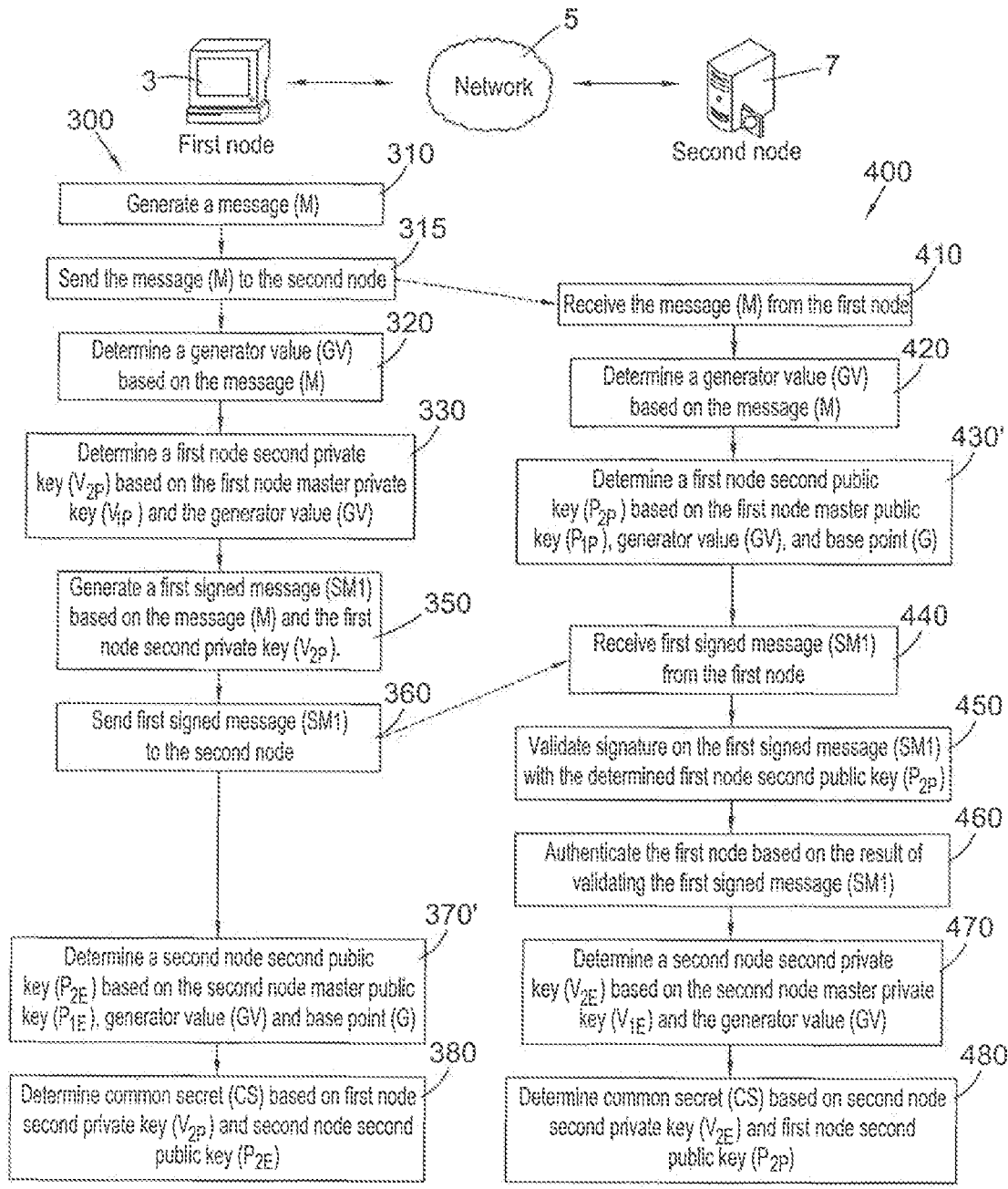
FIG. 6 is another flow chart of computer-implemented methods for determining a common secret.

The generator value that is determined in step 130 may be based on a message (M). As illustrated in FIG. 6, the method 300 performed by the first node 3 includes generating 310 a message (M). The message (M) may be random, pseudo random or user defined as described above with respect to the generator value.

In one example, the message (M) is based on Unix time and a nonce (arbitrary value). For example, the message (M) may be provided as:

$$\text{Message}(M) = \text{UnixTime} + \text{nonce} \tag{Equation 1}$$

The method 300 includes sending 315 the message (M), over the communications network 5, to the second node 7. The message (M) may be sent over an unsecure network as the message (M) does not include information on the private keys.

Determining the Generator Value (GV) from the Message (M)

The method 300 as illustrated in FIG. 6 further includes the step of determining 320 a generator value (GV) based on the message (M). In this example, this includes determining a cryptographic hash of the message. An example of a cryptographic hash algorithm includes SHA-256 to create a 256-bit generator value (GV). That is:

$$GV = \text{SHA-256}(M) \tag{Equation 2}$$

It is to be appreciated that other hash algorithms may be used. This may include other hash algorithms in the Secure Hash Algorithm (SHA) family. Some particular examples include instances in the SHA-3 subset, including SHA3-224, SHA3-256, SHA3-384, SHA3-512, SHAKE128, SHAKE256. Other hash algorithms may include those in the RACE Integrity Primitives Evaluation Message Digest (RIPEMD) family. A particular example may include RIPEMD-160. Other hash functions may include families based on Zémor-Tillich hash function and knapsack-based hash functions.

Determining a Second Node Second Public Key 140

The method 100 further includes determining 140 a second node second public key based on at least the second node master public key and the generator value.

As described above, the second node master public key and the second node master private key form a cryptographic pair. This cryptographic pair may be generated using the common elliptic curve cryptography (ECC) system with a base point (G).

That is, the step of generating the second node master public key and the second node master private key may comprise: generating the second node master private key ($V_{1E}$) based on a random integer in the allowable range specified in the common ECC system; and determining the first node master public key ($P_{1C}$) based on elliptic curve point multiplication of the first node master private key ($V_{1C}$) and the base point (G) according to the following formula:

$$P_{1P} = V_{1P} \times G. \quad \text{(Equation 3)}$$

In this example, since the public key (that is, the second node master public key $P_{1E}$) is determined 370' as the private key with elliptic curve point multiplication with the generator (G), it can be shown that the second node second public key ($P_{2E}$) can be expressed as:

$$P_{2E} = P_{1E} + GV \times G \quad \text{(Equation 4)}$$

Thus the second node second public key ($P_{2E}$) is not a random value but is instead deterministically derived given knowledge of the second node master public key.

Determining a First Output Script 150

The method 100 further includes determining 150 a first output script that is based on at least a first metadata that includes information associated with the first transfer. In the P2SH method of the bitcoin protocol, metadata may be included in the output script by way of the method outlined below.

Metadata

Metadata may be embedded in the redeem script in one or more of the 15 places available for the public keys in a P2SH multi-signature redeem script. For example, the redeem script may take the form of:
<NumSigs Metadata1 Metadata2 . . . PubK1 PubK2 . . . NumKeys
OP_CHECKMULTISIG>
where Metadata1 and Metadata2 each include metadata that takes the place of a public key in the redeem script and PubK1 and PubK2 are public keys.

By inserting metadata that is associated with the transfer of cryptocurrency, for example information associated with the payroll and the second node 7, the hash of the information will be included in the ledger when the transaction (Tx) is written to the blockchain.

Therefore, the use of multi-signature P2SH bitcoin transactions in embodiments of the present disclosure offers an advantage as it enables the transfer of cryptocurrency associated with a payroll to carry a metadata payload.

The metadata may include a description or keyword describing conditions associated with the transfer of cryptocurrency. For example, the date of the transfer, name, date of birth, address, contact details, or other details of the first user 23 or second user 24 at the first node 3 or second node 7 respectively may be included. In a further example, information associated with the quantity of cryptocurrency may be included.

In the example of where the first user 23 associated with the first node 3 is the employer and the second user 24 associated with the second node 7 is the employee, the information in the metadata may be analogous to the information in a traditional payslip. The metadata may comprise the name of the employer and employee, the pay period, date of payment, gross and net pay to the employee, the pay rate of the employee, any tax withheld or superannuation contributions, bonuses and the official business number of the employer (such as the Australian Business Number).

In a further example the metadata may comprise a string associated with the employer or employee, such as an identification number of series of characters.

The metadata in the redeem script may include the information in a number of ways. In one example, the contents of the information may be included. In a further example, a cryptographic hash of the information may be included. The hash of the information may be determined using the SHA-256 algorithm to create a 256-bit representation of the information. It is to be appreciated that other hash algorithms may be used, including other algorithms in the Secure Hash Algorithm (SHA) family. Some particular examples include instances in the SHA-3 subset, including SHA3-224, SHA3-256, SHA3-384, SHA3-512, SHAKE128, SHAKE256. Other hash algorithms may include those in the RACE Integrity Primitives Evaluation Message Digest (RIPEMD) family. A particular example may include RIPEMD-160. Other hash functions may include families based on Zémor-Tillich hash function and knapsack-based hash functions.

In a further example, the metadata may include a pointer, address or other reference to a location e.g. file that contains the information. For instance, the metadata may include a pointer to a payslip that is associated with the first node and the second node. This pointer may comprise an IPv6 address of the actual file location.

In further embodiments of the present disclosure, combinations including one or more of the above may be included in the metadata. Since the metadata may be made public by way of the P2P distributed ledger such as the Blockchain, or transmitted over an unsecure network, it may be desirable that specific details of the metadata be veiled or hidden for privacy reasons.

Sending a First Data Output to a P2P Distributed Ledger 160

The method 100 further includes sending 160, over a communications network 5, a first data output to a P2P distributed ledger provides a record on the ledger of the first transfer from the first node 3 to the second node 7. In other words, the transaction (Tx) is sent to the blockchain network for validation and subsequent inclusion in a block on the ledger.

The first data output may be the transaction record stored on the Blockchain. Each transaction record on the Blockchain comprises at least a first node public key associated with the first node 3 and a second node public key associated with the second node 7. The first node public key may comprise the first node master public key, first node second public key or first node additional public keys. The second node public key may comprise the second node master public key, second node second public key or second node additional public keys. As is described later in the present disclosure, methods 300 and 400 may be repeated to yield the first node additional public keys and the second node additional public keys. This identifies that the first node 3 and the second node 7 are involved in the transaction that is stored on the Blockchain.

Further, each transaction record on the Blockchain comprises at least an indication of the first transfer of a first quantity of cryptocurrency from the first node 3 to the second node 7.

Examples of transactions may include cryptocurrency transactions, fiat currency transactions or tokens as described in further detail below.

Variations

Determining a Common Secret for Securely Transmitting Data

To determine the generator value and common secret (CS) at both the first node 3 and second node 7, the nodes 3, 7 perform steps of respective methods 300, 400 without communicating private keys over the communications network 5. A description of the process of determining the generator value and common secret, as well as generating the first node second public and private keys and the second node second public and private keys now follows. A summary of the methods 300 and 400 is provided below with reference to the figures.

As illustrated in FIG. 4, the method 300 performed by the first node 3 includes determining 330 a first node second private key ($V_{2P}$) based on at least the first node master private key ($V_{1P}$) and a generator value (GV) as described above. The generator value (GV) may in some examples be based on a message (M) that is shared between the first and second nodes 3, 7, which may include sharing the message over the communications network 5 as described in further detail below. The method 300 also includes determining 370 a second node second public key ($P_{2E}$) based on at least the second node master public key ($P_{1E}$) and the generator value (GV). The method 300 includes determining 380 the common secret (CS) based on the first node second private key ($V_{2P}$) and the second node second public key ($P_{2E}$).

Importantly, the same common secret (CS) can also be determined at the second node 7 by method 400. The method 400 includes determining 430 a first node second public key ($P_{2P}$) based on the first node master public key ($P_{1P}$) and the generator value (GV). The method 400 further includes determining 470 a second node second private key ($V_{2E}$) based on the second node master private key ($V_{1E}$) and the generator value (GV). The method 400 includes determining 480 the common secret (CS) based on the second node second private key ($V_{2E}$) and the first node second public key ($P_{2P}$). The methods 300, 400 may be repeated to yield first node additional public keys or second node additional public keys, as will be described later.

The communications network 5, may include a local area network, a wide area network, cellular networks, radio communication network, the internet, etc. These networks, where data may be transmitted via communications medium such as electrical wire, fibre optic, or wirelessly may be susceptible to eavesdropping, such as by an eavesdropper 11. The method 300, 400 may allow the first node 3 and second node 7 to both independently determine a common secret without transmitting the common secret over the communications network 5. Thus one advantage is that the common secret (CS) may be determined securely by each node without having to transmit a private key over a potentially unsecure communications network 5. In turn, the common secret may be used as a secret key (or as the basis of a secret key) for encrypted communication between the first and second nodes 3, 7 over the communications network 5.

Determine the Common Secret 380 at the First Node 3 and Second Node 7

An example of determining a common secret (CS) will now be described with reference to FIG. 6. The common secret (CS) may be used for a particular session, time, transaction, or other purpose between the first node 3 and the second node 7 and it may not be desirable, or secure, to use the same common secret (CS). Thus the common secret (CS) may be changed between different sessions, time, transactions, etc.

The first node 3 may determine 380 the common secret (CS) based on the determined first node second private key ($V_{2P}$) and the determined second node second public key ($P_{2E}$). The common secret (CS) may be determined by the first node 3 by the following formula:

$$CS = V_{2P} \times P_{2E} \quad \text{(Equation 5)}$$

The second node 7 may further determine 470 the common secret (CS) based on the second node private key ($V_{2E}$) and the first node second public key ($P_{2P}$) based on the following formula:

$$CS = V_{2E} \times P_{2P} \quad \text{(Equation 6)}$$

Securely Transmitting Information

The metadata as described above may comprise information of a confidential or sensitive nature. The first node 3 or second node 7 may require secure transmission of at least part of metadata or the information contained in the metadata, which may be achieved by having only the hash of that information stored within the unlocking (redeem) script. In a further example, the first output script may need to be securely transmitted. In yet a further example, a message or information associated with the payroll and the second user 24 (for instance, details of a payslip) may require secure transmission from the first node 3 to the second node 7.

The present disclosure may be used to facilitate secure communication, in particular sending and receiving communication messages, between the first node 3 and the second node 7 over a potentially unsecure communications network 5. This may be achieved by using the common secret (CS) determined separately by the first node and second node as the basis for a symmetric-key. It is to be understood that there may be various methods of generating a common secret that can be used with the invention. However, the method of determining a common secret (CS) and using the symmetric-key for encryption and decryption of the communication messages as disclosed herein may be more computationally efficient compared to known public-key encryption methods.

Figure 7:
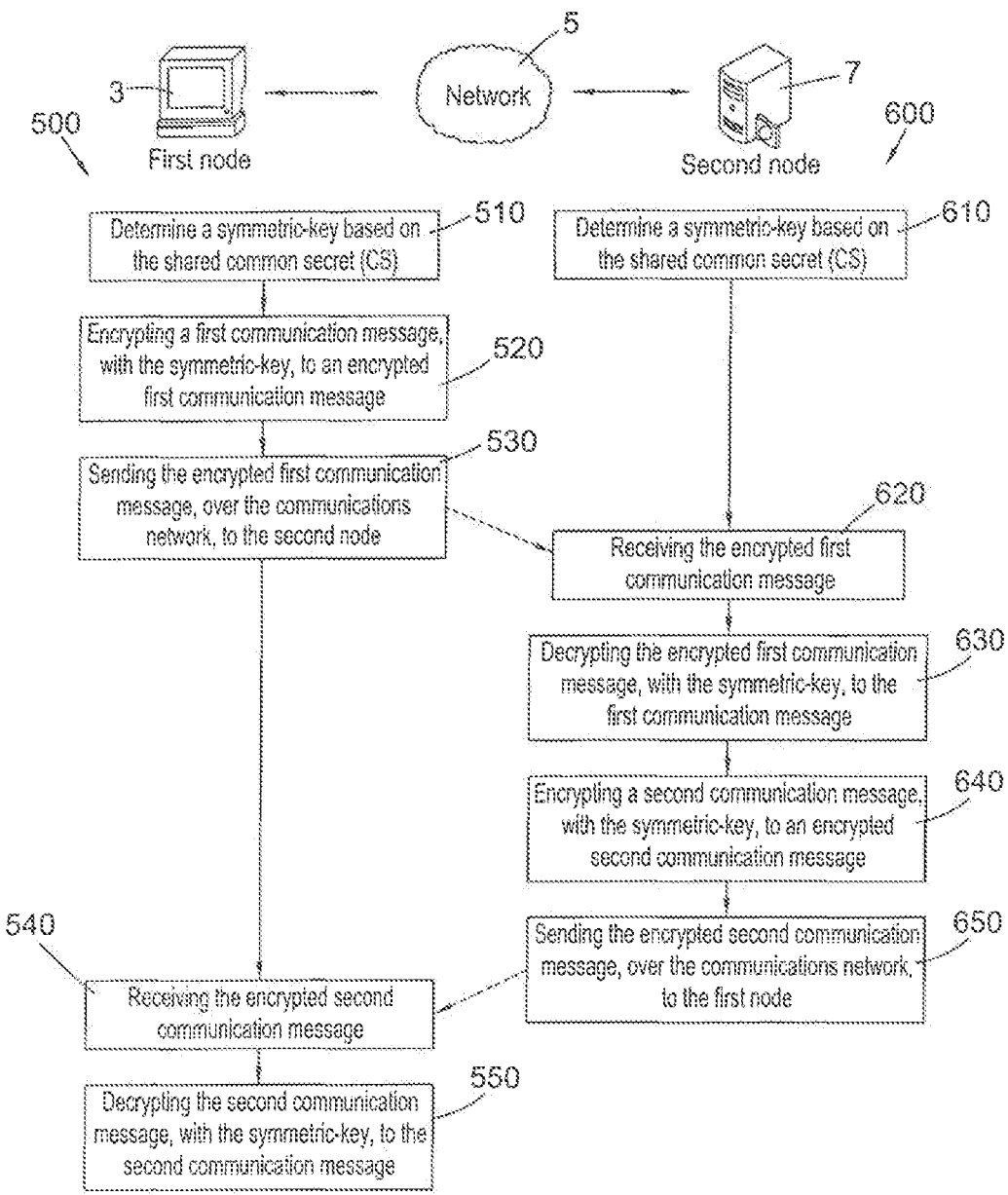
FIG. 7 is a flow chart of computer-implemented methods of secure communication between the first node and second node.

Methods 500, 600 of secure communication between the first node 3 and second node 7 will now be described with reference to FIG. 7. The first node 3 determines 510 a symmetric-key based on the common secret (CS) determined in the method above. This may include converting the common secret (CS) to a standard key format. Similarly, the second node 7 can also determine 610 the symmetric-key based on the common secret (CS).

To send a first communication message securely from the first node 3, over the communications network 5, to the second node 7, the first communication message needs to be encrypted. Thus the symmetric-key is used by the first node for encrypting 520 a first communication message to form an encrypted first communication message, which is then sent 530, over the communications network 5, to the second node 7. The second node 7, in turn, receives 620 the encrypted first communication message 620, and decrypts 630 the encrypted first communication message, with the symmetric-key, to the first communication message.

Similarly, the second node 7 may encrypt 640 a second communication message, with the symmetric-key, to an encrypted second communication message, which is then sent 650 to the first node 3. The first node 3 may then receive 540 the encrypted second communication message, and decrypt 550 it to the second communication message.

Hierarchy of Accounts—Chain Structure

As can be seen from the methods 300, 400 described above, the second node second public key ($P_{2E}$) is deterministically derived from the second node master public key ($P_{1E}$). Similarly, the first node second public key may also be deterministically derived from the first node master public key ($P_{1P}$). By performing the methods 300, 400 repeatedly, a first node additional public key and second node additional public key may also be deterministically derived.

That is, the methods 300, 400 described above may be used to determine a series of successive generator values, where each successive generator value may be determined based on the preceding generator value. Alternatively, successive keys may be determined based directly on the master key. Alternatively successive keys may be determined by a combination of the above methods.

For example, instead of repeating steps 310 to 370' of method 300 to generate successive single-purpose keys, by prior agreement between the nodes 3, 7, the previously used message for the generator value (GV) can be rehashed repeatedly by both parties to establish a hierarchy of generator values. In effect, the generator value, based on the hash of a message (M), can be a next generation message (M') for the next generation of generator value (GV-2). Doing this allows successive generations of shared secrets to be calculated without the need for further protocol-establishment transmissions, in particular transmission of multiple messages for each generation of common secrets. The next generation common secret (CS') can be computed as follows.

Firstly, both the first node 3 and the second node 7 independently determine the next generation of the generator value (GV-2). This is similar to steps 320 and 420 but adapted with the following formulas:

$$M'=\text{SHA-256}(M) \quad \text{(Equation 7)}$$

$$GV\text{-}2=\text{SHA-256}(M') \quad \text{(Equation 8)}$$

$$GV\text{-}3=\text{SHA-256}(\text{SHA-256}(M)) \quad \text{(Equation 9)}$$

The first node 3 may then determine the next generation of the second node second public key ($P_{3E}$) and the first node second private key ($V_{3P}$) similar to steps 370 and 330 as described above. In this example, the next generation is the third generation, i.e., the second node third public key and the second node third private key are determined. The second node 7 may then determine the next generation (third generation) of the first node second public key ($P_{3P}$) and the second node second private key ($V_{3E}$) similar to steps 430 and 470 as described above.

The first node 3 and the second node 7 may then each determine the next generation common secret (CS').

In particular, the first node 3 determines the next generation common secret (CS') with the formula:

$$CS'=V_{3P} \times P_{3E} \quad \text{(Equation 10)}$$

The second node 7 determines the next generation common secret (CS') with the formula:

$$CS'=V_{3E} \times P_{3P} \quad \text{(Equation 11)}$$

Further generations (CS", CS''', etc.) can be calculated in the same way to create a chain hierarchy. This technique requires that both the first node 3 and the second node 7 keep track of the original message (M) or the originally calculated generator value (GV), and to which node it relates. As this is publicly known information there are no security issues regarding the retention of this information. Accordingly, this information might be kept on 'hash tables' (linking hash values to public keys) and distributed freely across the network 5 (for example using Torrent). Furthermore, if any individual common secret (CS) in the hierarchy is ever compromised, this does not affect the security of any other common secrets in the hierarchy provided the private keys $V_{1P}$, $V_{1E}$ remain secure.

Figure 8:
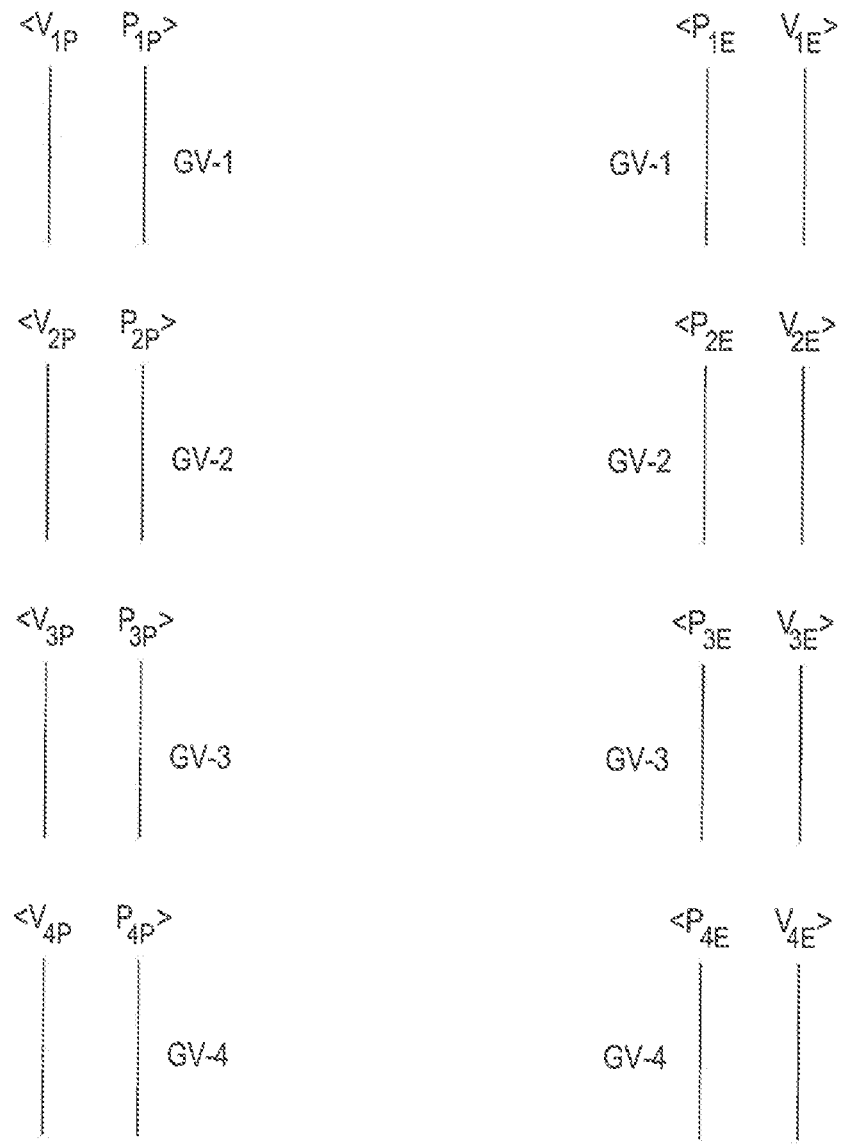
FIG. 8 is an example of a hierarchical chain structure of keys.

FIG. 8 demonstrates an example of a hierarchical chain structure of keys. In this structure, the generator values GV-2 and GV-3 may be computed as described above in Equations 7 to 9. However, it is to be understood that the generator values may be calculated in alternative ways.

The different keys may be used for different payment purposes and represent accounts associated with the first node 3 or the second node 7. For example, $P_{2P}$ may represent the account where the cryptocurrency, for example payroll funds of the employer associated with the first node, is transferred from and $P_{2E}$ may represent the corresponding account at the second node 7 that receives the transferred cryptocurrency from the first node 3.

In a further example, $P_{3P}$ may represent the tax withheld by the employer associated with the first node 3 for the second node 7 which may be transferred into the account represented by $P_{3E}$. In this example, the account represented by $P_{3E}$ may be associated with the tax withheld, or may be a general account for receiving cryptocurrency. In yet a further example, $P_{4P}$ (or any subsequent next generation public key) may represent the superannuation contribution of the second node, which may be transferred into $P_{4E}$ (or any subsequent next generation public key). In this example, the account represented by $P_{4E}$ may be associated with the superannuation contribution, or may be a general account for receiving cryptocurrency.

In the instance where the first node 3 transfers a second quantity of cryptocurrency associated with tax withheld to the second node 7, the second node 7 may request a second transfer associated with the received second quantity of cryptocurrency. This may comprise a transfer from the second node 7 to a further node that is representative of a relevant tax body, for example, the Australian Tax Office.

In a further example, in the instance where the first node 3 transfers a third quantity of cryptocurrency associated with a superannuation contribution to the second node 7, the second node 7 may request a third transfer associated with the third quantity of cryptocurrency. This may comprise a transfer from the second node 7 to a further node that is representative of a relevant superannuation fund.

In another example, the first node 3 may transfer the second quantity of cryptocurrency to the relevant tax body. In a further example the first node may transfer the third quantity of cryptocurrency to the relevant superannuation fund.

In yet another example, the first node 3 may make regular payments to the accounts associated with the second node 7 including payments to multiple accounts. The multiple accounts may represent a bank loan, house mortgage payment, a college fund account or a holiday fund. In this example, the next generation public key of the first node or the second node may represent the bank loan, house mortgage payment, college fund or holiday fund.

In another example, the message to generate the generator value may change with the generation of the successive keys. This may be necessary, for example, when there is a requirement for a shared common secret (CS) between the successive public keys. These common secrets may be used, for instance, for encryption of information relevant to the successive public keys.

Hierarchy of Accounts—Tree Structure

In another example, a hierarchy in the form of a tree structure can be created.

Figure 9:
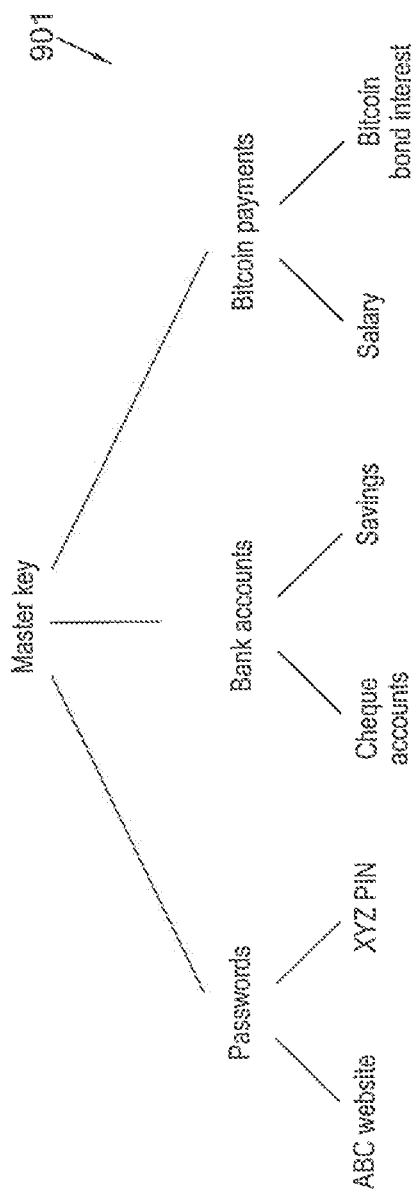
FIG. 9 is an example of a tree structure of different keys for different purposes.

With a tree structure, a variety of keys for different purposes such as authentication keys, encryption keys, signing keys, payment keys, etc. may be determined whereby these keys are all linked to a single securely maintained master key. This is best illustrated in FIG. 9 that shows a tree structure 901 with a variety of different keys. Each of these can be used to create a shared secret with another party.

Tree branching can be accomplished in several ways, three of which are described below.

(I) Master Key Spawning

In the chain hierarchy, each new 'link' (public/private key pair) is created by adding a multiply rehashed message to the original master key. For example, (showing only the private key of the first node 3 for clarity):

$$V_{2P} = V_{1P} + \text{SHA-256}(M) \quad \text{(Equation 12)}$$

$$V_{2P}' = V_{1P} + \text{SHA-256}(\text{SHA-256}(M)) \quad \text{(Equation 13)}$$

$$V_{2P}'' = V_{1P} + \text{SHA-256}(\text{SHA-256}(\text{SHA-256}(M))) \quad \text{(Equation 14)}$$

. . . and so on.

To create a branch, any key can be used as a sub-master key. For example $V_{2P}'$ can be used as a sub-master key ($V_{3P}$) by adding the hash to it as is done for the regular master key:

$$V_{3P} = V_{2P}' + \text{SHA-256}(M) \quad \text{(Equation 15)}$$

The sub-master key ($V_{3P}$) may itself have a next generation key ($V_{3P}'$), for example:

$$V_{3P}' = V_{2P}' + \text{SHA-256}(\text{SHA-256}(M)) \quad \text{(Equation 16)}$$

Figure 10:
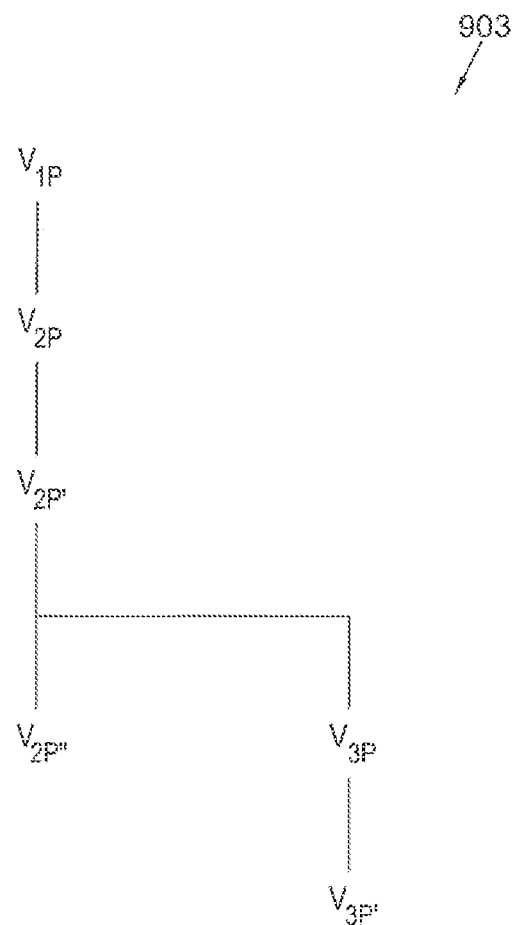
FIG. 10 is an example of a tree structure using the master key spawning method.

This provides a tree structure 903 using the master key spawning method as shown in FIG. 10.

(II) Logical Association

In this method all the nodes in the tree (public/private key pairs) are generated as a chain (or in any other way) and the logical relationships between the nodes in the tree is maintained by a table in which each node in the tree is simply associated with its parent node in the tree using a pointer. Thus the pointer may be used to determine the relevant public/private key pairs for determining the common secret key (CS) for the session.

(III) Message Multiplicity

New private/public key pairs can be generated by introducing a new message at any point in the chain or tree. The message itself may be arbitrary or may carry some meaning or function (e.g. it might be related to a 'real' bank account number, etc). It may be desirable that such new messages for forming the new private/public key pairs are securely retained.

Verifying the First Transfer

It may be desirable or required for the first node 3 or second node 7 to verify the first transfer of the first quantity of cryptocurrency. In some circumstances it may be required for a further node, such as the third node 9 or the issuer/service provider 25, to verify the first transfer. For instance, the employee associated with the second node may wish to confirm that the amount of cryptocurrency associated with the payroll funds is correct.

Figure 11:
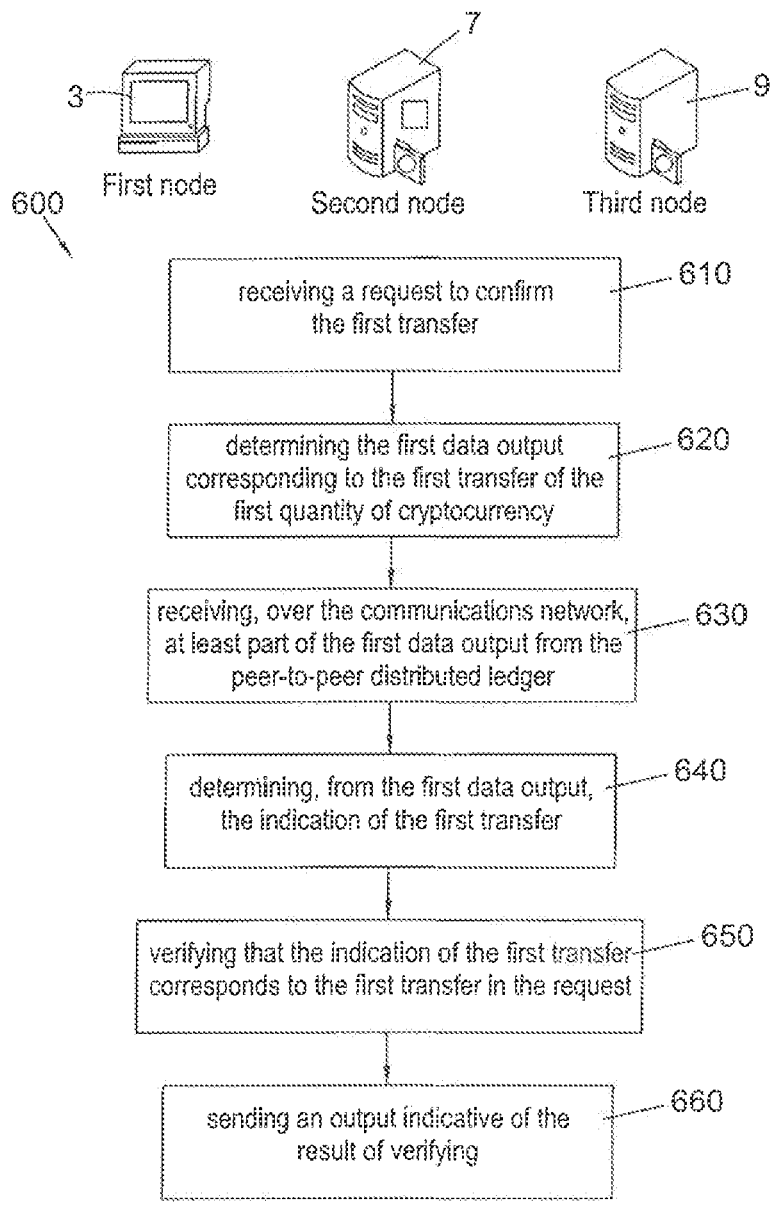
FIG. 11 is a flow chart of a computer-implemented method for verifying a transfer of cryptocurrency.

FIG. 11 illustrates a method 600 of verifying the first transfer of cryptocurrency from the first node 3 to the second node 7. The method 600 includes receiving 610 a request to confirm the first transfer. The request may be received at the first node 3, or at a further node such as the third node 9 in the instance where the third node 9 is facilitating the transfer of cryptocurrency. The method 600 includes determining 620 the first data output corresponding to the first transfer of the first quantity of cryptocurrency. Determining the first data output may include receiving the first data output from the first node 3 or the second node 7. In another example, it may include receiving the first data output from a further node such as the third node 9. In yet another example, it may include receiving the first data output from a data store 17.

The method 600 then includes receiving 630, over the communications network, at least part of the first data output from the P2P distributed ledger. This may include receiving part of the transaction record stored on the ledger.

The method 600 further includes determining 640, from the first data output, the indication of the first transfer and verifying 650 that the indication of the first transfer corresponds to the first transfer in the request. This may include, for example, confirming that the first quantity of cryptocurrency that is associated with the first transfer in addition to confirming that the public keys in the transaction record as received in step 630 correspond to the public keys of the first node 3 and the second node 7.

The method 600 further includes sending 660 an output indicative of the result of verifying. The output may be sent to the node that sent the request, for example the first node 3, the second node 7 or the third node 9. In a further example the output may be sent to more than one node.

Tokens

It will be appreciated that the first quantity of cryptocurrency, second quantity of cryptocurrency or third quantity of cryptocurrency as described in the methods above may relate to a token amount of cryptocurrency. Tokens may represent transferable contract conferring specified rights upon the holder to be redeemed for fiat currency, goods or services. The contract might be a machine executable smart contract, as known in the art.

Thus, the invention may incorporate a tokenisation technique or method for exchanging or transferring a digital token from one party to another. One such method, as mentioned above, comprises the steps of:

generating a blockchain transaction (Tx) having an output (TxO) related to a quantity of cryptocurrency, and a hash of a redeem script. The redeem script comprises:
metadata comprising a token which is a representation of, or a reference to, a tokenised entity;
and
at least one (preferably two or more) public cryptographic keys.

The quantity of cryptocurrency may be Bitcoin but the invention is not limited in this regard. The redeem script may be provided within a locking script associated with the transaction output TxO. The metadata may be provided in the redeem script at a location which is designated in the blockchain's underlying protocol as a location for a cryptographic key.

The method may further include the step of submitting the transaction Tx to the blockchain. In effect, the cryptocurrency may thus be locked on the blockchain in association with the token. The quantity of cryptocurrency can only be spent (redeemed) upon provision of an unlocking script which meets the requirements of the locking script for the output TxO. In particular, a redeem script must be presented which, when hashed, matches the hash provided in the locking script of TxO. As the locking script for output TxO comprises the hash of the redeem script which in turn includes the token (in the metadata), the cryptocurrency is associated with the token. Upon presentation of the correct unlocking (redeem) script, ownership of the cryptocurrency may be transferred to the redeeming party or user i.e. it is spent.

In summary, a token is an exchangeable entity that can be used to represent a contract or some other type of entity. The contract may take one of several forms. It may be a computer-executable smart contract. For example, the contract may confer a right upon the holder or denote ownership of property. The value of the token may be contractually specified and is linked to the underlying bitcoin amount of the output (TxO) via a 'pegging rate'. The token is exchangeable via a novel type of transaction using a cryptocurrency protocol such as the bitcoin protocol. The bitcoin value on the transaction output (TxO) acts as a token representing a rights contract in digital form. The contract itself may be stored on the transaction, or somewhere else on the blockchain, or off the blockchain, or may be kept in a publicly accessible location, or may be held privately by the parties to the contract depending on the particular embodiment. Where the contract is not stored on or in the transaction, the transaction may store a unique pointer or reference to the contract.

Tokens may be divisible. A divisible token is one in which the value on the transaction output can be subdivided into smaller amounts which can be allocated across multiple new tokens. Examples of divisible tokens include tokens for fiat currency or for shares in a race horse. Divisible contracts may be defined as those that specify a non-zero pegging rate. In other words, the token value is tied to the underlying bitcoin value. Alternatively, tokens may be non-divisible. A non-divisible token is a contract that specifies the holder's rights in terms of a fixed value, e.g. a contract to redeem a house or AU$1000. Non-divisible tokens are therefore not linked to the value of the underlying bitcoin.

In some examples, tokens must be digitally signed by a token issuer to be valid. The issuer may, for example be an authority such as a Registrar of Title deeds. The issuer may issue a token to a user in return for payment. That token may then give the user the right to exercise the contract linked to the token, whether the contract represents the right to redeem fiat currency or for a service to performed.

Examples of tokens include:
A fiat currency token that is pegged to the BTC value of the transaction output by the issuer of the contract. For example, "the spender of this token (bitcoin transaction) is entitled to redeem any fraction of this token for Australian dollars at a rate of 1 share (10 cents) for every 1000 satoshi".

Partial ownership in an item such as a photocopier.
Employee leave entitlements such as annual leave or personal leave.
Further employee benefits such as time in lieu, overtime or bonuses.
Employee fringe benefits.
A contract for the right to a service to be performed. It is noted that this is not the same as the actual service itself, but only the right to have the service performed for them. This right can be traded. For example, a voucher from Michael's Mowing for up to 3 hours lawn mowing within the Sydney metropolitan area. The holder of this voucher (contract) can redeem it for the actual service.

Tokens must specify the value of a share, e.g., 1 share=10 cents CAD, 1 share=1 rupiah, 1 share=1 day of annual leave, or 1 share=1% ownership of an item (photocopier, computer, etc).

In one embodiment of the methods described above, the method may be used to comprise tokenised benefits in addition to or in lieu of cryptocurrency. For example, the second user 24 (employee) associated with the second node 7 may receive a tokenised benefit of an hour of annual leave for every month of employment at the first user 23 (employer) associated with the first node 3.

The details associated with the tokenised benefits may be placed in the redeem script of a P2SH transaction. For example, the details may be comprised in the metadata field of the redeem script according to the methods described above.

In this instance, the first node 3 acts as an issuer of the tokens and creates the tokens to represent the benefits. The tokens can then be transferred from the first node 3 to the second node 7, for example into the main payroll account of the second node 7 or another derived account.

In another example, the third node 9 may act as the issuer. In another example, the issuer/service provider 25 may act as the issuer.

The tokens received by the second node 7 may be transferred to another node. For example, the tokens may be transferred to another employee of the employer associated with the first node 3. Effectively, the transferable tokens described above may represent tradable employment rights and benefits of the first node (employer) or second node (employee). These tokenised rights and benefits may be traded between different employees of the same employer.

Processing Device

As noted above, the first and second nodes 3, 7 may be an electronic device, such as a computer, tablet computer, mobile communication device, computer server etc. The electronic device may include a processing device 21, 27, a data store 17 and a user interface 15.

Figure 12:
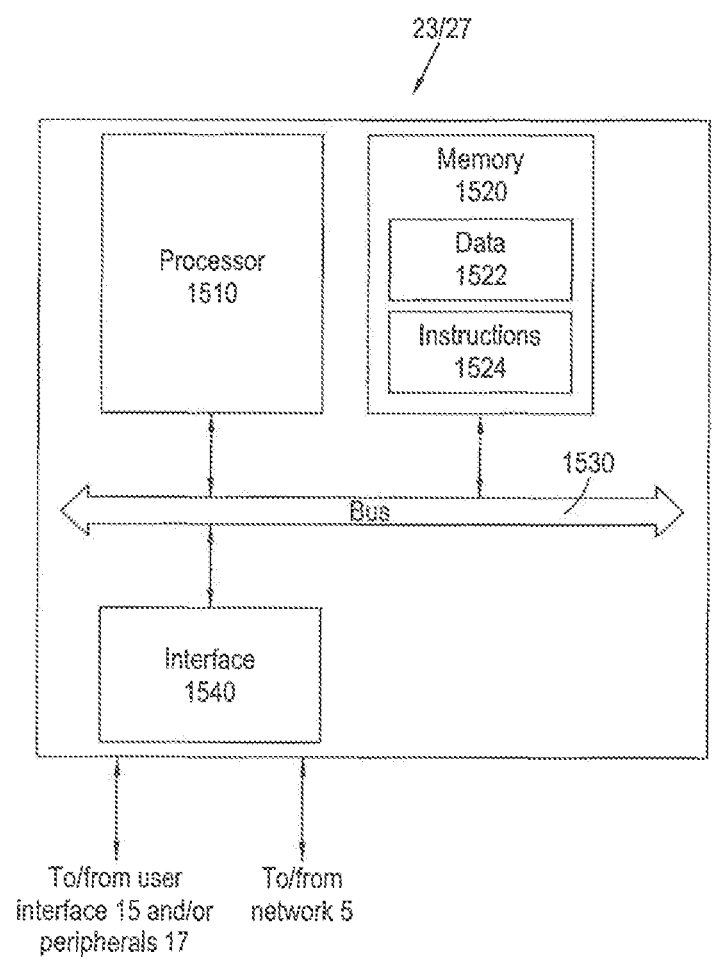
FIG. 12 illustrates a schematic of an example processing device.

FIG. 12 illustrates an example of a processing device 21, 27. The processing device 21, 27 may be used at the first node 3, second node 7 or other nodes 9 or 25. The processing device 21, 27 includes a processor 1510, a memory 1520 and an interface device 1540 that communicate with each other via a bus 1530. The memory 1520 stores instructions and data for implementing the method 100, 200, 300, 400 described above, and the processor 1510 performs the instructions from the memory 1520 to implement the method 100, 200, 300, 400. The interface device 1540, may include a communications module that facilitates communication with the communications network 5 and, in some examples, with the user interface 15 and peripherals such as data store 17. It should be noted that although the processing device 1501 may be independent network elements, the processing device 501 may also be part of another network element. Further, some functions performed by the processing device 1501 may be distributed between multiple network elements. For example, the first node 3 may have multiple processing devices 21 to perform method 100, 300 in a secure local area network associated with the first node 3.

Where this disclosure describes that a user, employer, employee, issuer, merchant, provider or other entity performs a particular action (including signing, issuing, determining, calculating, sending, receiving, creating etc.), this wording is used for the sake of clarity of presentation. It should be understood that these actions are performed by the computing devices operated by these entities.

A user having an account with another entity may comprise the entity storing information about the user, such as email address, name and potentially public keys. For example, the entity may maintain a database, such as SQL, OrientDB, MongoDB or others. In some examples, the entity may also store one or more of the user's private keys.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer-implemented method of verifying a transfer of a quantity of cryptocurrency, wherein a token is associated with the quantity of cryptocurrency, wherein the token is transferred from a first node to a second node the method implemented by a processing resource, the method comprising:
  receiving a request to confirm the transfer;
  determining a data output corresponding to the transfer of the quantity of cryptocurrency using a peer-to-peer distributed ledger;
  receiving, over a communications network, at least part of the first data output from the peer-to-peer distributed ledger;
  determining, from the data output, an indication of the transfer;
  verifying that the indication of the transfer corresponds to the transfer in the request; and
  sending an output indicative of a result of verifying, wherein determining from the data output, an indication of the transfer comprises:
    determining from the peer-to-peer distributed ledger an indication of the transfer from the first node to the second node; and
    a first output script associated with the quantity of cryptocurrency.

2. The method of claim 1, wherein the token comprises information associated with employment rights and benefits of the first node or second node.

3. The method according to claim 1, wherein the output script comprises metadata that includes information associated with the transfer; and a public key associated with a second node which received the transfer from the first node.

4. The method according to claim 1, wherein verifying that the indication of the transfer corresponds to the transfer in the request comprises confirming that a plurality of public keys in a transaction record correspond to public keys of the respective first and second nodes.

5. A non-transitory computer readable storage medium comprising computer-executable instructions that when executed by a processing device, cause the processing device to:
  receive a request to confirm the transfer;
  determine a data output corresponding to the transfer of the quantity of cryptocurrency using a peer-to-peer distributed ledger;
  receive, over a communications network, at least part of the first data output from the peer-to-peer distributed ledger;
  determine, from the data output, an indication of the transfer;
  verify that the indication of the transfer corresponds to the transfer in the request; and
  send an output indicative of a result of verifying, wherein determining from the data output, an indication of the transfer comprises:
    determining from the peer-to-peer distributed ledger an indication of the transfer from the first node to the second node; and
    a output script associated with the quantity of cryptocurrency.

6. A device comprising a processor and a memory coupled to the processor, the memory storing thereon computer-executable instructions that when executed cause the processor to perform the method of claim 1.

* * * * *